United States Patent
Rizvi et al.

(10) Patent No.: US 11,661,346 B2
(45) Date of Patent: May 30, 2023

(54) FUNCTIONALLY GRADED ALL-GRAPHENE BASED FREE-STANDING MATERIALS, METHODS OF MAKING AND USES THEREOF

(71) Applicant: The University of Toledo, Toledo, OH (US)

(72) Inventors: Syed Reza Rizvi, Toledo, OH (US); Sheikh Rasel, Toledo, OH (US); Omkar Bhatkar, Toledo, OH (US); David Smith, Toledo, OH (US)

(73) Assignee: The University of Toledo, Toledo, OH (US)

( * ) Notice: Subject to any disclaimer, the term of this patent is extended or adjusted under 35 U.S.C. 154(b) by 964 days.

(21) Appl. No.: 16/261,138

(22) Filed: Jan. 29, 2019

(65) Prior Publication Data

US 2019/0233292 A1 Aug. 1, 2019

Related U.S. Application Data

(60) Provisional application No. 62/624,953, filed on Feb. 1, 2018.

(51) Int. Cl.
*B32B 9/00* (2006.01)
*C01B 32/198* (2017.01)

(52) U.S. Cl.
CPC ........ *C01B 32/198* (2017.08); *C01B 2204/04* (2013.01); *C01B 2204/22* (2013.01); *Y10T 428/30* (2015.01)

(58) Field of Classification Search
USPC ........................................................ 428/408
See application file for complete search history.

(56) References Cited

U.S. PATENT DOCUMENTS

| | | | |
|---|---|---|---|
| 9,105,403 B2 | 8/2015 | Yang et al. | |
| 9,278,319 B2 | 3/2016 | Hoek et al. | |
| 9,640,746 B2 | 5/2017 | Ma et al. | |
| 9,779,884 B2 | 10/2017 | El-Kady et al. | |
| 2010/0102292 A1* | 4/2010 | Hiura | H01L 21/823828 257/E21.042 |
| 2010/0273060 A1 | 10/2010 | Yang et al. | |
| 2012/0021224 A1 | 1/2012 | Everett et al. | |
| 2013/0140649 A1 | 6/2013 | Rogers et al. | |
| 2015/0248972 A1* | 9/2015 | Tang | B32B 9/04 264/299 |
| 2017/0318625 A1* | 11/2017 | Boughiat | H05B 3/0014 |

OTHER PUBLICATIONS

Chen et al., "An improved Hummers method for eco-friendly synthesis of graphene oxide", Carbon, 2013, vol. 64, pp. 225-229.
Hu et al., "Spontaneous Reduction and Assembly of Graphene oxide into Three-Dimensional Graphene Network on Arbitrary Conductive Substrates", Scientific Reports, 2013, pp. 1-10.
Shao et al., "Self-Assembly of Graphene Oxide at Interfaces", Advanced Materials, 2014, vol. 26, pp. 5586-5612.
Cao et al., "Ambient Fabrication of Large-Area Graphene Films via a Synchronous Reduction and Assembly Strategy", Advanced Materials, 2013, vol. 25, pp. 2957-2962.

* cited by examiner

*Primary Examiner* — Daniel H Miller
(74) *Attorney, Agent, or Firm* — MacMillan, Sobanski & Todd, LLC

(57) ABSTRACT

Functionally graded graphene materials, methods of making and uses thereof are described.

16 Claims, 32 Drawing Sheets

(29 of 32 Drawing Sheet(s) Filed in Color)

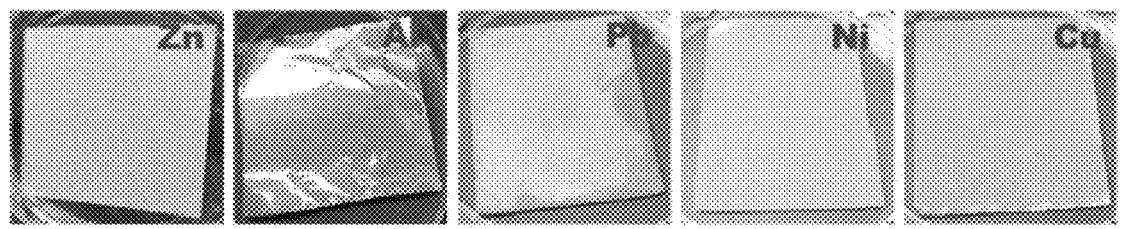
FIG. 10
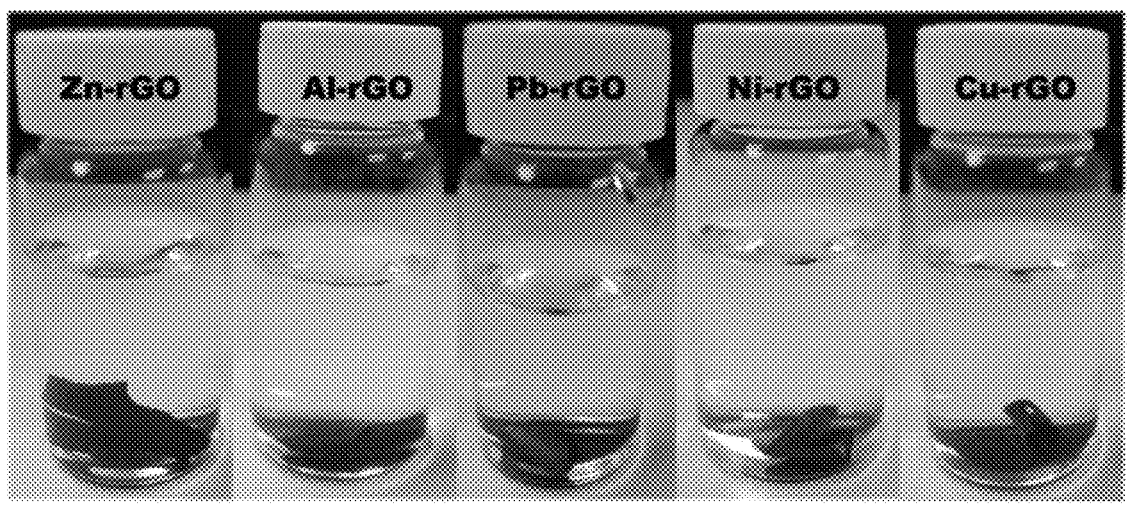
FIG. 11A
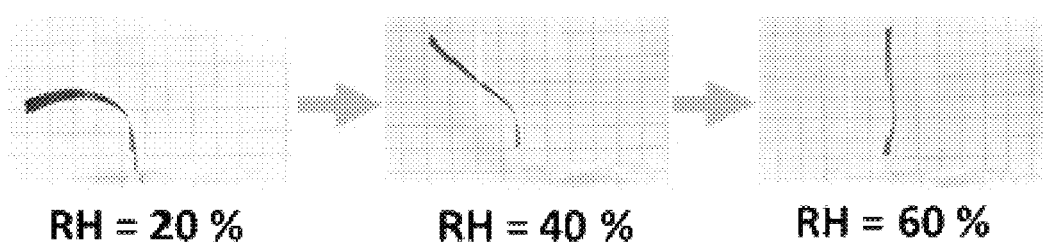
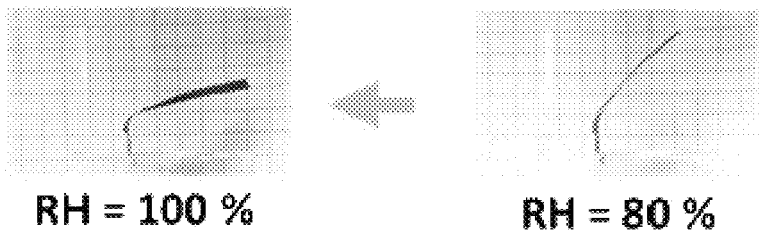
FIG. 11B

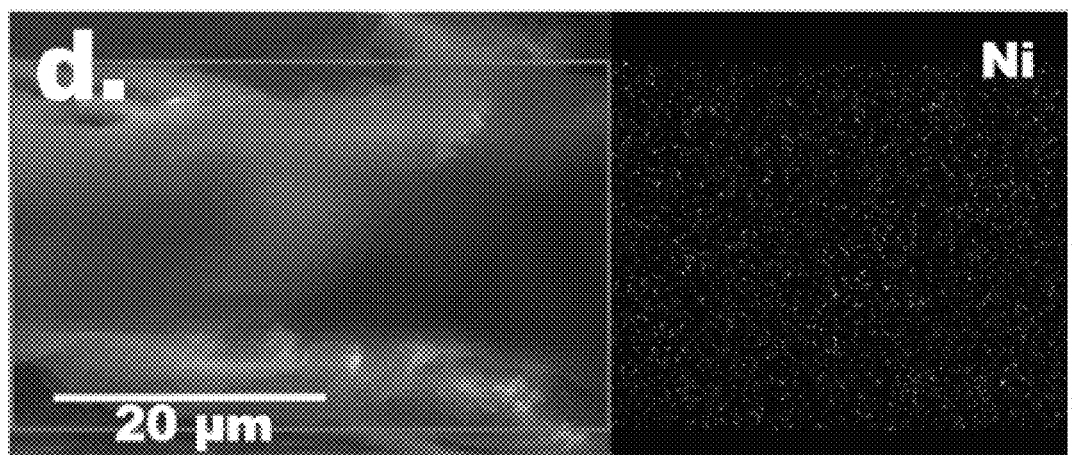
FIG. 13D
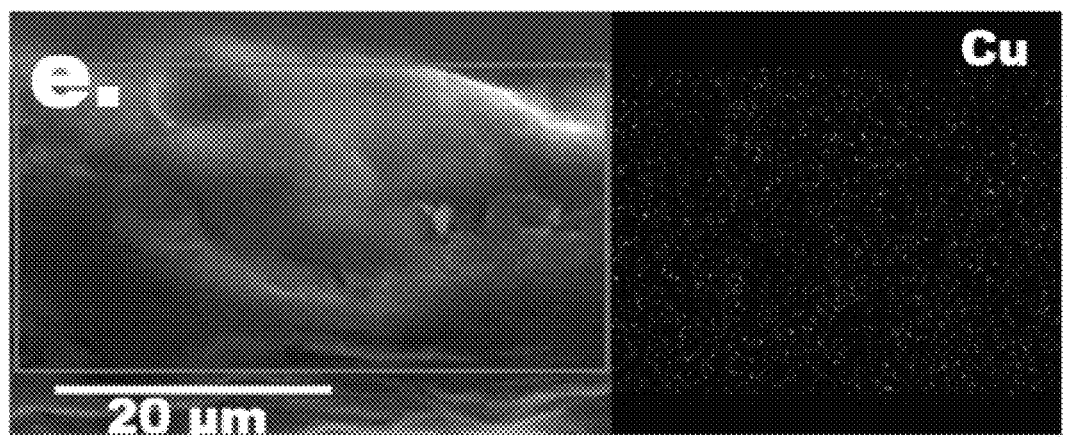
FIG. 13E
| Sample | Reduced side | | | | | Non-reduced side | | | | |
|---|---|---|---|---|---|---|---|---|---|---|
| | $C=C$ ($sp^2$) (%) | $C-C$ ($sp^3$) (%) | $C-OH$ (%) | $C=O$ (%) | $HO-C=O$ (%) | $C=C$ ($sp^2$) (%) | $C-C$ ($sp^3$) (%) | $C-OH$ (%) | $C=O$ (%) | $HO-C=O$ (%) |
| Zn-rGO | 54.6 | 23.7 | 14.3 | 3.8 | 3.5 | 10.3 | 36.9 | 37.4 | 5.4 | 10 |
| Al-rGO | 63.5 | 18.9 | 7.4 | 8.3 | 1.9 | 20.1 | 29.4 | 36.7 | 10.8 | 3.0 |
| Pb-rGO | 15.9 | 53.5 | 27.0 | 1.2 | 2.3 | 23.7 | 22.0 | 47.6 | 4.4 | 2.3 |
| Ni-rGO | | | | | | 8.1 | 36.1 | 48.6 | 5.3 | 1.8 |
| Cu-rGO | 8.0 | 52.4 | 33.2 | 4.5 | 1.8 | 1.3 | 40.5 | 49.5 | 6.4 | 2.4 |
FIG. 14

| Sample | XPS – reduced side | | | | XPS – non-reduced side | | | |
|---|---|---|---|---|---|---|---|---|
| | C (%) | O (%) | atomic (%) | C/O ratio | C (%) | O (%) | atomic (%) | C/O ratio |
| Zn-rGO | 73.4 | 21.4 | 4.4 (Zn) | 3.4 | 70.9 | 27.9 | 0.7 (Zn) | 2.5 |
| Al-rGO | 85.7 | 13.2 | 0.7 (Al) | 6.5 | 69.2 | 28.5 | 0.6 (Al) | 2.4 |
| Pb-rGO | 59.3 | 25.3 | 3.1 (Pb) | 2.3 | 71.5 | 27.5 | 0 (Pb) | 2.6 |
| Ni-rGO | 76.4 | 29.7 | 0.4 (Ni) | 3.6 | 69.8 | 28.9 | 0 (Ni) | 2.4 |
| Cu-rGO | 74.5 | 24.3 | 0 (Cu) | 3.1 | 68.9 | 29.7 | 0 (Cu) | 2.3 |

FIG. 15

| Sample | Reduced side | | | | Non-reduced side | | | |
|---|---|---|---|---|---|---|---|---|
| | C (%) | O (%) | atomic (%) | C/O ratio | C (%) | O (%) | atomic (%) | C/O ratio |
| Pristine GO | - | - | - | - | 69.9 | 29.9 | - | 2.3 |
| Pb-FGG | 61.4 | 27.5 | 3.4 (Pb) | 2.3 | 71.5 | 27.5 | 0 (Pb) | 2.6 |
| Ni-FGG | 76.7 | 21.0 | 0.4 (Ni) | 3.6 | 69.9 | 28.9 | 0 (Ni) | 2.4 |
| Cu-FGG | 74.4 | 24.2 | 0.1 (Cu) | 3.1 | 69.0 | 29.7 | 0 (Cu) | 2.3 |

FIG. 16

| Sample | Reduced side | | | | | | Transition GO/rGO region | | | | | | Non-reduced side | | | | | |
|---|---|---|---|---|---|---|---|---|---|---|---|---|---|---|---|---|---|---|
| | $C=C$ ($sp^2$) (%) | $C-C$ ($sp^3$) (%) | $C-O$ (%) | $C-O-C$ (%) | $C=O$ (%) | $HO-C=O$ (%) | $C=C$ ($sp^2$) (%) | $C-C$ ($sp^3$) (%) | $C-O$ (%) | $C-O-C$ (%) | $C=O$ (%) | $HO-C=O$ (%) | $C=C$ ($sp^2$) (%) | $C-C$ ($sp^3$) (%) | $C-O$ (%) | $C-O-C$ (%) | $C=O$ (%) | $HO-C=O$ (%) |
| Zn-FGG | 48.3 | 33.9 | 8.9 | 3.3 | 0.0 | 2.8 | 40.3 | 39.9 | 8.6 | 3.4 | 0.4 | 3.4 | 18.9 | 29.2 | 38.6 | 8.6 | 0.0 | 2.5 |
| Al-FGG | 59.4 | 29.4 | 6.7 | 2.8 | 0.0 | 1.7 | 22.6 | 25.3 | 32.9 | 15.9 | 0.0 | 3.3 | 22.2 | 27.2 | 37.6 | 8.5 | 0.0 | 2.0 |

FIG. 17

| Sample | Reduced side | | | | | | Non-reduced side | | | | | |
|---|---|---|---|---|---|---|---|---|---|---|---|---|
| | $C=C$ ($sp^2$) (%) | $C-C$ ($sp^3$) (%) | $C-O$ (%) | $C-O-C$ (%) | $C=O$ (%) | $HO-C=O$ (%) | $C=C$ ($sp^2$) (%) | $C-C$ ($sp^3$) (%) | $C-O$ (%) | $C-O-C$ (%) | $C=O$ (%) | $HO-C=O$ (%) |
| Pristine GO | - | - | - | - | - | - | 11.7 | 25.5 | 47.8 | 10.2 | 0.0 | 3.9 |
| Pb-FGG | 28.9 | 43.1 | 17.3 | 7.2 | 0.0 | 1.5 | 5.5 | 42.1 | 35.3 | 11.3 | 0.8 | 2.0 |
| Ni-FGG | 39.4 | 26.6 | 18.7 | 8.3 | 0.5 | 4.5 | 13.7 | 30.9 | 40.7 | 10.0 | 0.0 | 3.4 |
| Cu-FGG | 27.4 | 30.8 | 28.1 | 8.1 | 0.2 | 2.3 | 8.6 | 32.1 | 37.9 | 12.4 | 2.6 | 4.2 |

FIG. 18

FUNCTIONALLY GRADED ALL-GRAPHENE BASED FREE-STANDING MATERIALS, METHODS OF MAKING AND USES THEREOF

CROSS-REFERENCE TO RELATED APPLICATIONS

This application claims the benefit of United States Provisional Application Ser. No. 62/624,953 filed Feb. 1, 2018, the entire disclosure of which is expressly incorporated herein by reference.

STATEMENT REGARDING FEDERALLY SPONSORED RESEARCH

The invention was not made with any U.S. Government support, and the United States Government has no rights in the invention.

BACKGROUND OF THE INVENTION

Graphene, a two-dimensional (2D) carbon material arranged in a $sp^2$-bonded honeycomb network, possesses very large surface area along with excellent in-plane thermal, mechanical and electrical properties resulting in a significant research thrust for its use in applications such as energy storage devices, chemical and bio-sensors, electronic and photonic devices, and electromechanical systems. The continuous efforts have been directed towards the development of large-scale graphene films with easy processing path and low cost to meet the demands of its potential applications.

Graphene oxide (GO), an oxidized derivative of graphene, is an ideal candidate for large-scale production of graphene at low cost, considering the abundance of the cheap supply of graphite, its simple yet scalable chemical synthesis and its ability to be dispersed in an aqueous environment. Graphene oxide can be converted to its electrically conducting variant, reduced-graphene oxide (rGO), through a variety of reduction approaches such as chemical, thermal hydrothermal, photothermal, and electrochemical.

However, reducing GO in a manner that is environmentally friendly, non-hazardous, reasonably fast, efficient, and able to be integrated with existing processes is still sought. Unfortunately, prior metal assisted GO reduction processes are solution-based methods, requiring multiple steps and long reduction periods, including acidic or high temperature environments, that lessen their effectiveness, compared to single step reduction methods of GO formation such as chemical or thermal reduction. Therefore, it would be useful to have a way to efficiently form GO.

SUMMARY OF THE INVENTION

In one aspect, there is provided improvements in the field of transient or temporary electronics, which can be decommissioned by an external stimulus with minimal impact to the surrounding environment.

Described herein is a functionally graded graphene-based (FGG) material that is useful in electrical circuits and circuit elements for transient electronic applications.

In a first aspect, there is provided herein a composition comprising a functionally graded graphene-based (FGG) material having: a first side comprising an at least partially electrically conductive reduced graphene oxide (rGO), and an opposite side comprising an at least partially insulating graphene oxide (GO); where a gradient of rGO-to-GO exists from the first side to the opposite side; and, where the FGG material has disintegration characteristics upon exposure to a trigger environmental stimulus.

In certain embodiments, the rGO first side of the FGG material has a porous surface, and wherein the surface morphologies on the GO opposite side are relatively smooth.

In certain embodiments, GO in the FGG material is present at concentrations ranging from 45-60 mg/mL GO.

In certain embodiments, the trigger environmental stimulus comprises exposure to an aqueous environment.

In certain embodiments, the FGG material comprises a free standing film.

In certain embodiments, the FGG material comprises a percentage of carbon and oxygen such that the FGG material has low-to-no environmental impact.

In certain embodiments, the FGG material has a thickness selected in accordance with a preselected electrical conductivity for the FGG material.

In another aspect, there is provided herein a method for forming a functionally graded graphene-based (FGG) material, comprising: coating a graphene oxide based material (GO) on a metal substrate, and drying the GO-coated metal substrate for a period of time sufficient for functional grading of GO-to-rGO to result from the competing kinetic effects of metal-based redox and drying of the GO coating.

In certain embodiments, the substrate metal comprises one or more of: Ni, Pb, Cu, Al, and Zn.

In certain embodiments, the method further includes providing a concentration of GO in the GO coating in an amount sufficient for the GO coating to at least partially gel, and thereby prevent the reduction of the GO throughout the entire thickness of the FGG material.

In certain embodiments, the method further comprises varying one or more of: the pH of the GO coating, the concentration of GO in the GO coating, the metal substrate, the oxide content of the metal substrate, and the surface finish of the metal substrate.

In certain embodiments, the GO coating is applied at a thickness selected in accordance with a preselected electrical conductivity for the FGG material.

In certain embodiments, the GO coating is applied at deposition thicknesses ranging from 100 to 400 gm.

In certain embodiments, the drying temperature ranges from 40° C. to 60° C., and drying humidity ranges from 55% to 65%.

In certain embodiments, the GO coating is dried at 40-60° C. for 3 h.

In certain embodiments, GO is present concentrations ranging from 45-60 mg/mL GO in the FGG material.

In certain embodiments, upon removing the dried GO coating from the metal substrate, the thickness of the FGG material ranges from about 22 to about 87 μm.

In certain embodiments, the method further includes, after drying, removing the dried GO coating from the metal substrate to form a free-standing FGG material.

In certain embodiments, the GO coating is dried at a rate such that the elimination of oxygen-containing functional groups and restoration of conjugated ri structure are not uniform throughout the FGG material, resulting in a functionally graded conductive rGO and insulating GO structure in a single FGG material.

In certain embodiments, the FGG material comprises a FGG film produced in continuous roll-to-roll basis.

In another aspect, there is provided a device comprising the FGG material described herein.

In certain embodiments, the device is one or more of: a transient electronic device, flexible circuitry, RFID tags electrodes, biodegradable products, functional labeling/coatings for polylactide based food packaging.

In certain embodiments, in the device, the FGG material is patterned by a template or a mask, thereby allowing for through-profile as well as lateral placement of both electrically conducting (rGO) and non-conducting (GO) regions in a single device.

In another aspect, there is provided herein a method for creating a device, where a mask of a desired pattern is employed at an interface of a metal substrate and a GO coating, wherein reduction of GO occurs only on those portions which are exposed to the metal substrate while the remaining portions stay as GO.

Other systems, methods, features, and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

FIG. 10. Photographs showing the growth of hydrogen bubbles on various metal substrates under immersed of 0.1 M HCl acid for 10 minutes at 25° C., (Zn, Al, Pb, Ni, and Cu, respectively).

FIG. 11A. Photographs showing the curling behavior of bilayer-like arrangement of the GO and rGO structures in the FGG films during immersion in DI water (Zn, Al, Pb, Ni, and Cu, respectively).

FIG. 11B. The curling behavior of a bilayer-like arrangement of the GO and rGO structures in the Al-FGG films under different humidity conditions.

FIG. 13D. The elemental mapping of FGG films reduced on Ni. The metal elements were distributed uniformly throughout the films.

FIG. 13E. The elemental mapping of FGG films reduced on Cu. The metal elements were distributed uniformly throughout the films.

FIG. 14. Table showing the fitted results of C1s XPS spectra of reduced and non-reduced side of FGG films reduced on various active metal substrates.

FIG. 15. Table showing the chemical compositions of reduced and non-reduced side of FGG films derived from C1s XPS spectra.

FIG. 16. Table showing the chemical compositions of pristine GO and reduced and non-reduced side of various FGG films derived from C1s XPS spectra.

FIG. 17. Table showing the fitted results of C1s XPS spectra of reduced, transition, and non-reduced side of FGG films reduced on Zn and Al active metal substrates.

FIG. 18. Table showing the fitted results of C1s XPS spectra of pristine GO film and reduced and non-reduced side of FGG films reduced on various active metal substrates.

FIG. 20A—ultimate tensile strength, FIG. 20B—Young's modulus, and FIG. 20C—strain at failure.

DETAILED DESCRIPTION

Figure 1A:
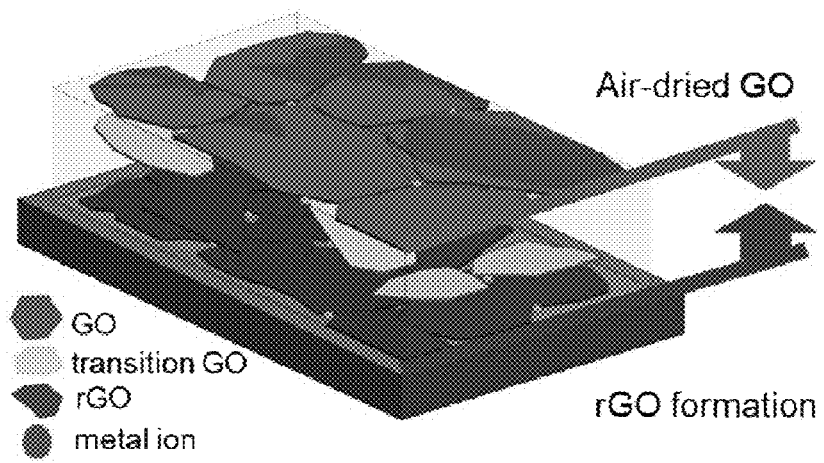
FIG. 1A. Schematic of graphene oxide (GO) film drying and reduced graphene oxide (rGO) formation and deposition.

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

The recently conceived concept of transient electronics calls for functional electronic components that can undergo a programmed decommissioning/destruction. Such capability can be required in multiple scenarios, such as crypto-hardware designs, medical devices, and environmentally benign electronics for mitigating e-waste. Crypo-hardware designs, particularly in the defense field, require electronic systems whose destruction can be triggered so that all hardware design and function information is irrecoverable. Implantable medical devices would require electronic components that are biocompatible and biodegradable over time so that there is no need for them to be removed surgically once their purpose is fulfilled. Finally, the estimated 42 million tons per year of electronic waste worldwide motivates the design and use of transient electronics, which contain environmentally benign components that can be degraded over time in the natural environment—thus, mitigating any concerns for life-cycle management.

Transient electronics are considered to include multicomponent systems constructed using conductive and usually reactive metals (i.e., Mg, Fe, Mo, W, and Zn), semiconductors (doped Si) and insulators (i.e., MgO, $SiO_2$, and $Si_3N_4$), which are all held together by a water or acid soluble encapsulation layer (i.e., poly(vinyl alcohol) (PVA), polyvinylpyrrolidone (PVP), polylactic acid (PLA), polycaprolactone (PCL), and poly-(phthalaldehyde) (PPA)).

Graphene oxide based electronics are not designed with transient operations in mind. However, the dispersability of graphene oxide in water can facilitate the design of all-graphene based electronics with transient properties.

Described herein is a facile and one-step metal-assisted coating process useful for making all-graphene based functionally graded (FGG) materials, such as transient electronics. Control of processing conditions such as the underlying substrate metal and the drying environment, results in an ability to tailor the internal architecture of the FGG material as well as to functionally grade the reduction of GO. Furthermore, the ability to create masks for selective reduction of GO on metal interfaces is also demonstrated, which was used to create intricate yet well-defined patterns and connections required in electronic circuits and devices. All graphene based free standing films with selectively reduced GO are useful in transient electronics application as flexible circuitry, and RFID tags electrodes, where decommissioning of the FGG material is easily achieved through immersion in an aqueous environment.

It is to be understood that the terms "FGG material" and "film/s" are interchangeable, and that no limitations on the use of either term is contemplated.

All graphene based functionally graded films are developed by a single-step film coating process on various active metal substrates. The functionally graded reduction of GO film where one side was electrically conductive rGO and the opposite side was insulating GO are be produced by manipulating the underlying substrate metal and the film drying environment. Based on SEM, EDX, Raman, XRD, FTIR, TGA, XPS and sheet resistance results, the reduction of GO on Zn substrate was very effective upon restoring the conjugated $sp^2$ network while removing the oxygen-containing functional groups, followed by Al, Pb, Ni, and Cu substrates. All graphene based free-standing RFID tags antenna have the featured disintegration characteristic when exposed to distilled water at room temperature.

The large-scale functionally graded graphene (FGG) films formed by the methods described herein provide a facile, cost-effective, recycling, and environmentally friendly approach, and combined with the transient behaviors, such films have many applications including electronic devices and sensors addressing the low manufacturing costs and environmental issues.

The films are made using graphene oxide in a single step process. Upon exposure to a trigger environmental stimulus, the films begin to disintegrate. Since the composition of the film is mostly carbon and oxygen, the film has low-to-no environmental impact. Such films find practical applications in printable electronics for integration with biodegradable products such as functional labeling/coatings for polylactide based food packaging.

One advantage of the present method is that the rGO films obtained are functionally graded in a single step. The functional grading of free standing rGO films exhibits partial conductive layers on the opposite film surfaces. Such a type of grading can be of benefit in various electronic applications. The films are electrically insulating on the non-reduced side and conductive on the reduced side giving the films superior electrical properties.

Moreover, the films are safe to the environment as the films do not involve use of chemical etching or other hazardous reagents. The films are easily disintegrate in presence of water without generating any environmentally unsafe waste.

Also the films obtained are stronger and flexible in nature than previous rGO films because of the presence of a GO grade layer which can form strong hydrogen bonds.

The method described herein provides for ability to functionally grade the reduction of the GO film in the presence of a metal substrate so that one side is primarily the electrically conductive "reduced graphene oxide "rGO" while the opposite side is the electrically insulating GO, as schematically illustrated in FIG. 1A.

The functionally graded graphene film is fundamentally different from all other metal-based techniques, which reduce all of the GO film indiscriminately.

The presently described method has a high starting GO concentration (for example, 5-100 mg/ml). Having a functionally graded profile with significant amounts of GO on one side provides multiple benefits for freestanding graphene based electronic devices.

Firstly, the GO-supported films are significantly more mechanically robust than rGO films because of the presence of secondary hydrogen bonding. Secondly, the GO films are electrically insulating but ionically conductive, thereby allowing for through-profile as well as lateral placement of both electrical (rGO) and ionic (GO) conducting regions in a single device by a simple template-based fabrication step.

Finally, GO is hydrophilic, and can be easily rehydrated and dispersed in an aqueous environment, thereby imparting any GO-supported films the ability to be used as transient (degradable) electronics. By controlling the film mechanical and electrical properties, various suitable transient electronics can be made for low-cost disposable communication systems (e.g. RFID).

The functional grading results from the competing kinetic effects of metal-based redox and film drying once GO has been coated on a metal. Since the concentration of the GO in the process is relatively high, the GO tends to gel very easy preventing the reduction of the GO throughout the film.

The material parameters are the GO flake size and quality (oxidation level), the pH of GO, the GO concentration and the underlying metal substrate, its oxide content and its surface finish.

The process parameters are the deposition thickness, the film drying temperature and the film drying humidity and pressure.

The functionally graded graphene based material is useful in both graphene-based devices and in transient electronics. For example, functional grading of an all graphene based film is useful in applications where a compositional gradient is beneficial—e.g. actuators (bi-metallic strips), mass transport barriers etc.

The functionally graded graphene based transient electronics are environmentally benign for single-use temporary electronics for use in low-cost communications technologies In certain embodiments, the functionally graded graphene films can be made using a roll-to-roll film processing.

For a roll-to-roll production of FGG film, coating techniques inspired from automatic battery electrode fabrication can be adopted, which have features such as metallic foil roll unwinding (reeling out), coating blade, baking oven, and final electrode winding (reeling in). Similar to this approach, the GO paste can be automatically coated on the metallic foil or sheet and the FGG film can be peeled-off roll-to-roll after the drying process.

It is to be understood that the terms "paste" and "coating/s" are interchangeable, and that no limitations on the use of either term is contemplated.

The present invention is further defined in the following Examples, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference. The following examples are intended to illustrate certain preferred embodiments of the invention and should not be interpreted to limit the scope of the invention as defined in the claims, unless so specified.

The value of the present invention can thus be seen by reference to the Examples herein.

Graphene Oxide Preparation

In one embodiment, graphite powder was oxidized into graphite oxide through a modification of the Hummers method, as described in Marcano, D. C. et al., "Improved Synthesis of Graphene Oxide," ACS Nano 4:4806-4814 (2010).

The Hummers method is a chemical process that can be used to generate graphite oxide through the addition of potassium permanganate to a solution of graphite, sodium nitrate, and sulfuric acid. See, for example, Hummers Jr, W. S. & Offeman, R. E., "Preparation of graphitic oxide," Journal of the American Chemical Society 80:1339-1339 (1958).

It is also within the contemplates scope of the presently described methods that other improved Hummers methods (for example, without using $NaNO_3$) can be used produce graphene oxide nearly the same to that prepared by conventional Hummers method, as described in Yao et al., "An improved Hummers method for eco-friendly synthesis of graphene oxide," Carbon, 64: 225-229 (2013).

Graphene Oxide Film Deposition and Reduction

A highly concentrated graphene oxide (50 mg/mL) gel paste was doctor blade coated on various polished metallic substrates. The substrates investigated were Cu, Ni, Pb, Al, Zn metals. The metal foil and thin-sheet substrates were adhered to a flat glass plate using a kapton pressure adhesive. Various blade gaps were set and calibrated using feeler gauges. The GO gel paste was deposited at one end of the metal substrate and was manually coated using the doctor blade in a uniform manner. The entire coating assembly was then air dried at various temperatures and humidity conditions. After drying, the film was easily peeled-off from the metal substrate and was found to be a free-standing functionally graded graphene (FGG) film.

Characterization

The morphology and elemental analysis of FGG samples were characterized by scanning electron microscopy (FEI Quanta™ 3D FEG Dual Beam Electron Microscope). The Raman spectra were recorded by Jobin Yvon Horiba™ Confocal Raman Spectrometer in a back scattering configuration with a 632 nm He—Ne laser excitation. Olympus BX41 Microscope with 50×magnification was used during the Raman analysis. X-ray diffraction (XRD) measurements were performed by using Rigaku™ Ultima III high resolution X-ray diffractometer with small-angle X-ray scattering (SAXS). Cu Kα radiation ($\lambda$=0.154 nm) was utilized in the 2θ range from 5-80 degrees with a scanning speed of 1°/min. X-ray photoelectron spectroscopy (XPS) measurements of the samples were carried out on Kratos™ Analytical High Sensitivity XPS using the focused monochromatized Al Kα radiation (hv=1486.6 eV), which was corrected by the C1s line at 284.6 eV. The sheet resistance of the samples was measured using a Siglent™ SDM 3055 Digital Multimeter with a Signatone™ SP4 four-point probe at room temperature.

Results

Figure 1B:
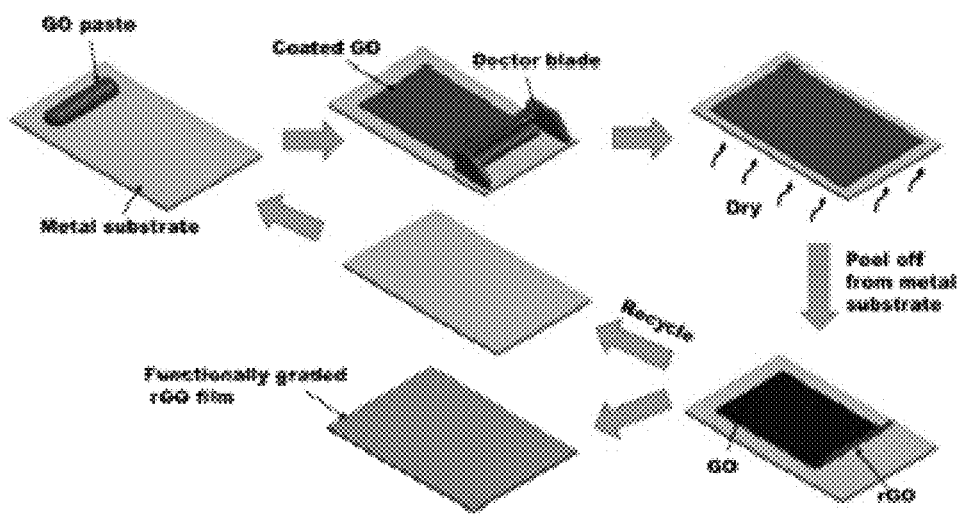
FIG. 1B. Schematic drawings of the reduction process of GO film on metal substrate.
Figure 7:
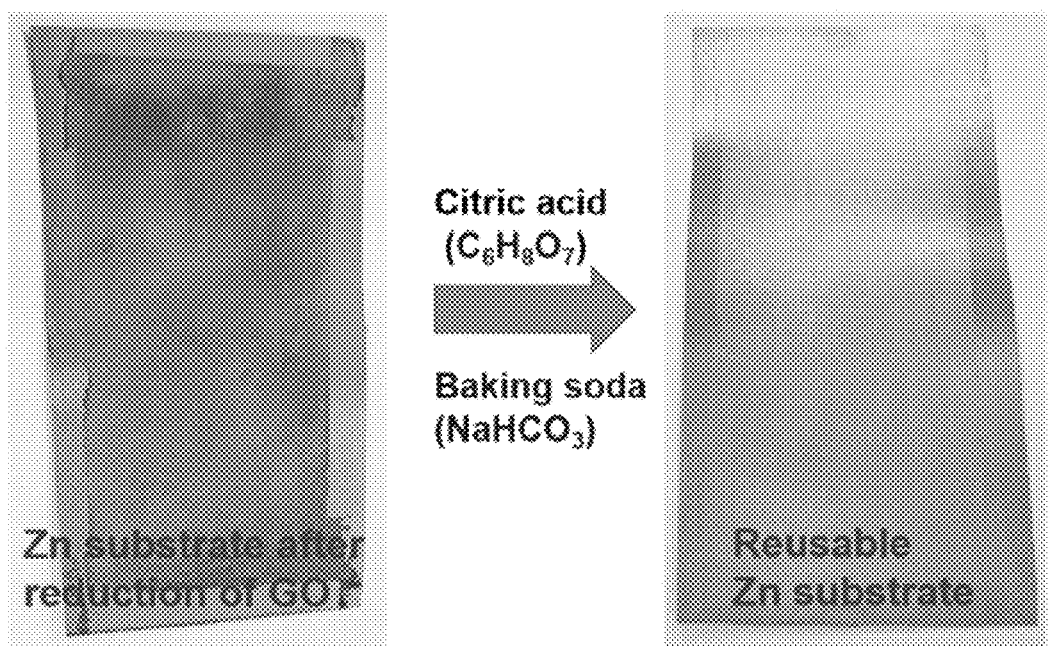
FIG. 7. Recycling process of metal substrate for use in the next round of fabrication.
Figure 8A:
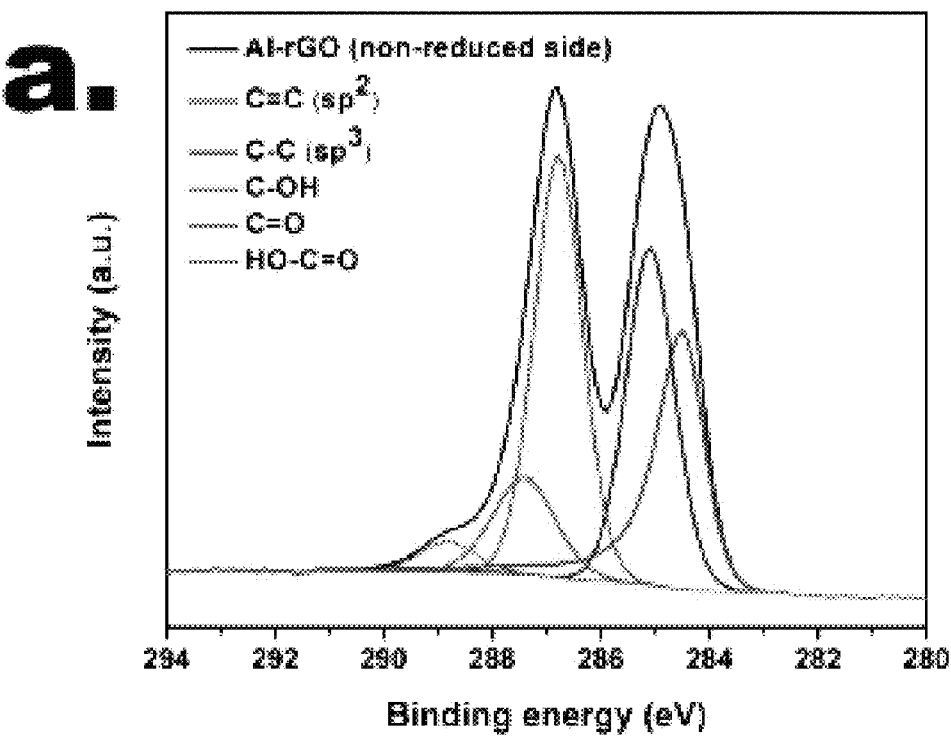
FIG. 8A. Cls spectra of non-reduced side of FGG films on Al.
Figure 8B:
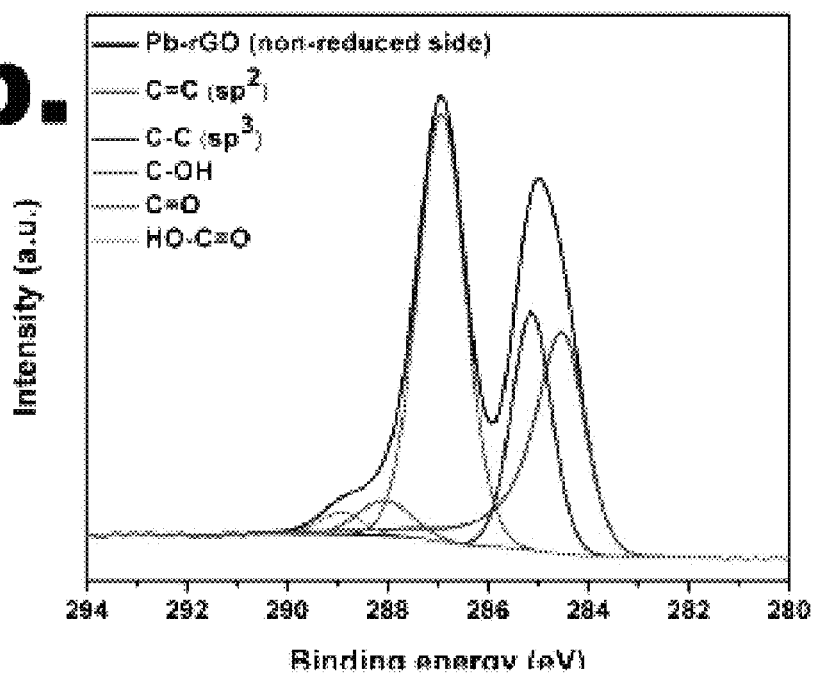
FIG. 8B. Cls spectra of non-reduced side of FGG films on Pb.
Figure 8C:
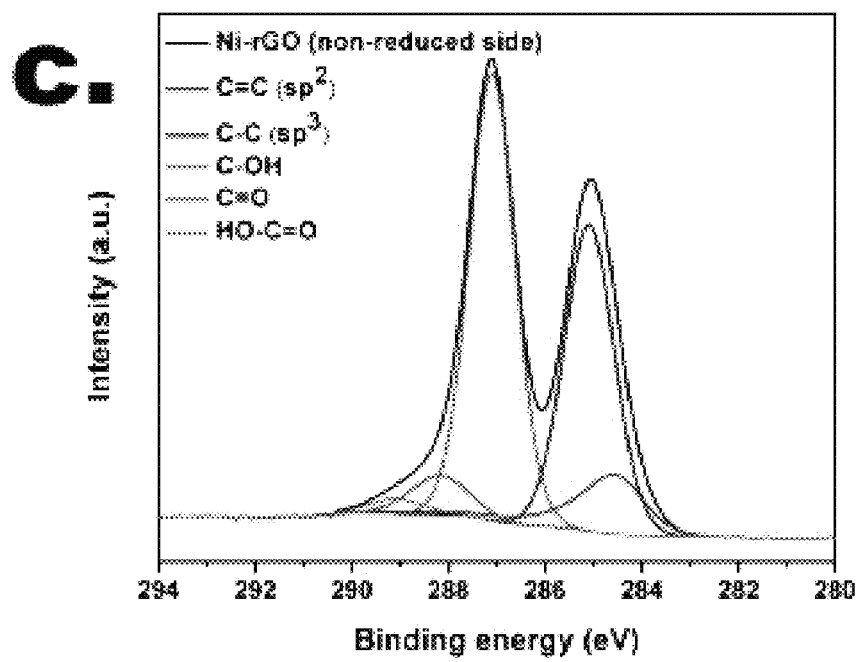
FIG. 8C. Cls spectra of non-reduced side of FGG films on Ni.
Figure 8D:
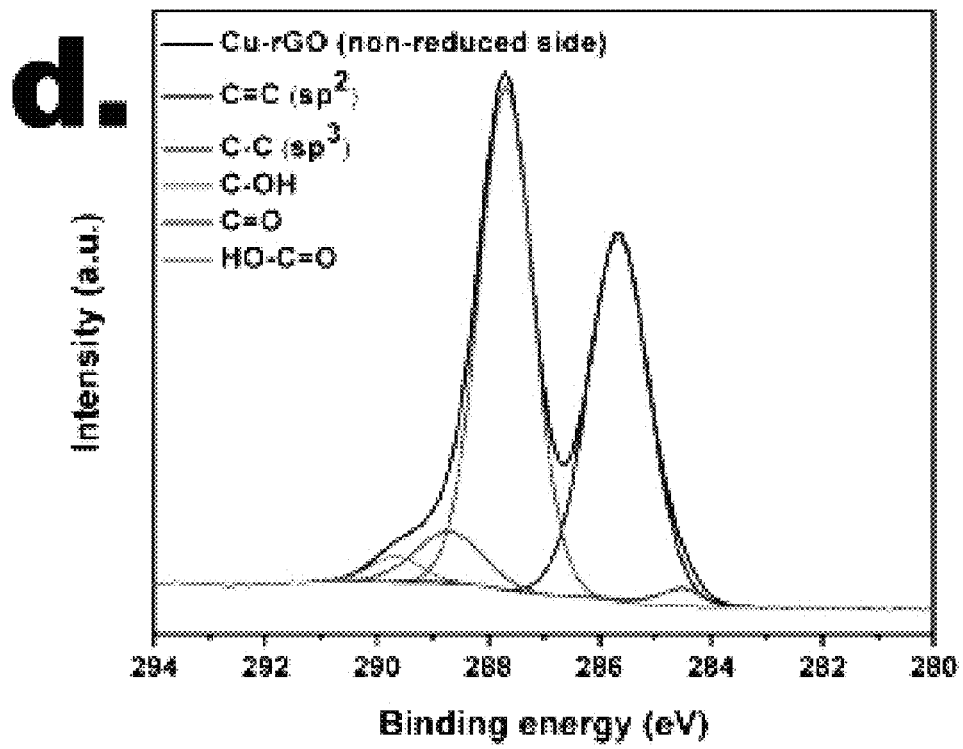
FIG. 8D. Cls spectra of non-reduced side of FGG films on Cu.

An experimental procedure of fabricating paper-like functionally graded graphene (FGG) films is shown in FIG. 1B. A high concentration of GO paste (50 mg/mL) was coated uniformly on a metal substrate (i.e., zinc, aluminum foil, nickel, copper, and lead) by using a doctor blade. The final FGG film thickness can be well regulated by controlling the coating thickness using the gap between the blade and the metal substrate. The coated graphene oxide was typically dried at 40° C. for 3 h using a hot plate. A free-standing and paper-like FGG film was manually peeled-off from the metal substrate. The remaining metal substrate can be recycled (see FIG. 7) for use in the next round of fabrication.

An FGG structure, where one side is primarily the electrically conductive rGO while the opposite side is the electrically insulating GO, can be prepared by either controlling (1) the concentration of GO, (2) the underlying metal substrate, (3) the film deposition thickness, (3) the film drying temperature and (4) the film drying humidity.

Figure 1C:
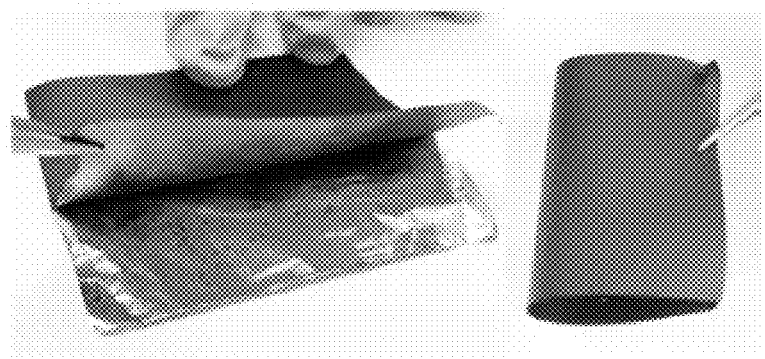
FIG. 1C. Photograph of FGG film on Al foil illustrating shiny rGO luster on the metal touching face and GO structure on the other side having flexible property.

FIG. 1C illustrates an FGG film deposited on Al foil exhibiting a shining black graphite surface on the contact regions of Al foil and brown-black color of GO on the top surface of the film, indicating the discriminate reduction of GO during the film coating and drying process. The FGG film can be prepared in any shape and size using active metal substrates in a one-step coating method. The final film is mechanically robust and free-standing as demonstrated by its ability to be completely bent without fracturing. The GO can be selectively reduced using a template at the interface between the GO and the metal substrate—only a select portion of GO, which is exposed to the active metal substrate, undergoes reduction.

Figure 1D:
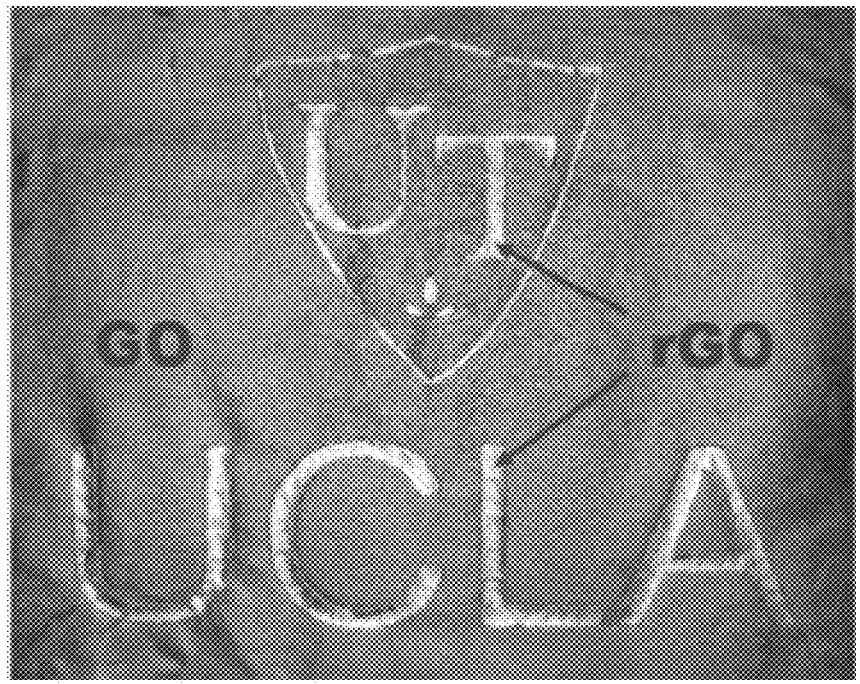
FIG. 1D. Photograph of selective reduction of GO with imprinted institutional logos.
Figure 1E:
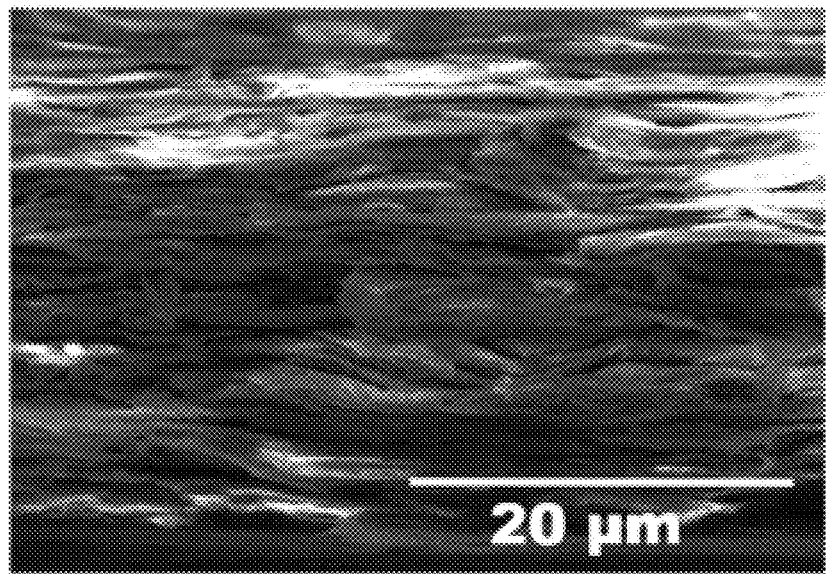
FIG. 1E. SEM image of the cross-section of Al-rGO film, showing flake-like deposition.

FIG. 1D demonstrates an example of selective reduction of GO, where the institutional logos have been imprinted and reduced on the overall GO substrate. The cross-sectional image of Al foil assisted FGG film obtained by scanning electron microscopy (SEM) is presented in FIG. 1E. The surface morphology of the film revealed that the GO sheets assembled into a well-packed layered microstructure of graphene and graphene oxide sheets.

The reduction and water evaporation of GO occur simultaneously upon coating the GO on an active metal substrate. The base of the film, which is in contact with the metal, is electrically conductive indicating that the reduction of GO occurred through the removal of oxygen-containing functional groups. In contrast, the opposite side, which is exposed to the environment during the drying process, was found to remain electrically insulating. Unlike other GO reduction processes where the GO reduces indiscriminately, the FGG films in the present method transition from being electrically conductive at one face while being insulating at the opposite face.

The underlying metallic substrates play an important role to reduce GO by eliminating its oxygen-containing functional groups and to form the FGG films. Several FGG films were fabricated on Zn, Al, Pb, Ni, and Cu substrates by the coating of GO paste (50 mg/mL) with a thickness of 300 μm and dried at 50° C. and 60% humidified environments.

Figure 2A:
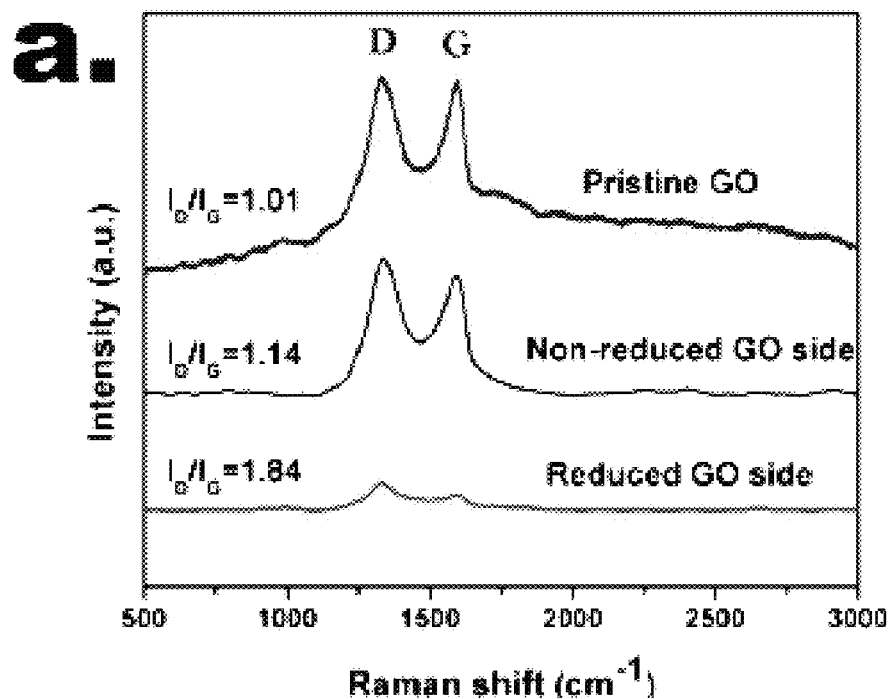
FIG. 2A. Structural characterization of pristine GO and FGG film reduced on Zn using Raman spectra.

The discriminate reduction of either side of the FGG film reduced on Zn was investigated. The differences in reduction between either sides of the films were characterized by Raman spectroscopy of the graphitic microstructure as reduction involves removal of the oxygen functional groups and recovery of the n-conjugated structure. The FGG films reduced on Zn exhibited the characteristic D- and G-bands in their Raman spectra on either conductive or insulated sides (FIG. 2A).

The D-band is a disorder activated shift attributed from the electrons configuration of carbon atoms and the G-band is appeared from the recovery of the hexagonal network of C atoms with defects. A D-band at 1344 $cm^{-1}$ and a G-band around 1590 $cm^{-1}$ appeared in the spectra on the non-reduced side of FGG film, whereas, rGO side showed two intense peaks at 1332 $cm^{-1}$ and 1595 $cm^{-1}$, corresponding to the D and G bands, respectively. The pristine GO without reduction shows a G peak at around 1604 $cm^{-1}$, which is expected to shift towards 1580 $cm^{-1}$ (graphite) after reduction. However, a slight reverse shift of the G band is observed after the reduction of GO on zinc, which is now believed to be due to the presence of metal elements on the FGG film.

The intensity ratio of the D- and G-bands ($I_D/I_G$) offers insights into the extent of reduction through the liberation of oxygen containing point and edge defect sites. The intensity ratio of D to G peak ($I_D/I_G$) was determined to be 1.14 and 1.84 on the non-reduced and reduced side of FGG film, respectively, indicating discriminate structural configurations on opposite sides of the FGG film. The $I_D/I_G$ ratio for pristine GO was 1.01, which is lower than either side of FGG file reduced on Zn. The increase of $I_D/I_G$ ratio might be resulted by the decrease of average size of $sp^2$ domains upon reduction of the GO. As compared to the carbon domains existing in the GO before reduction, the newly created large number of defect-free $sp^2$ carbon produce smaller domains upon reduction, which results in large quantities of structural defects.

Figure 2B:
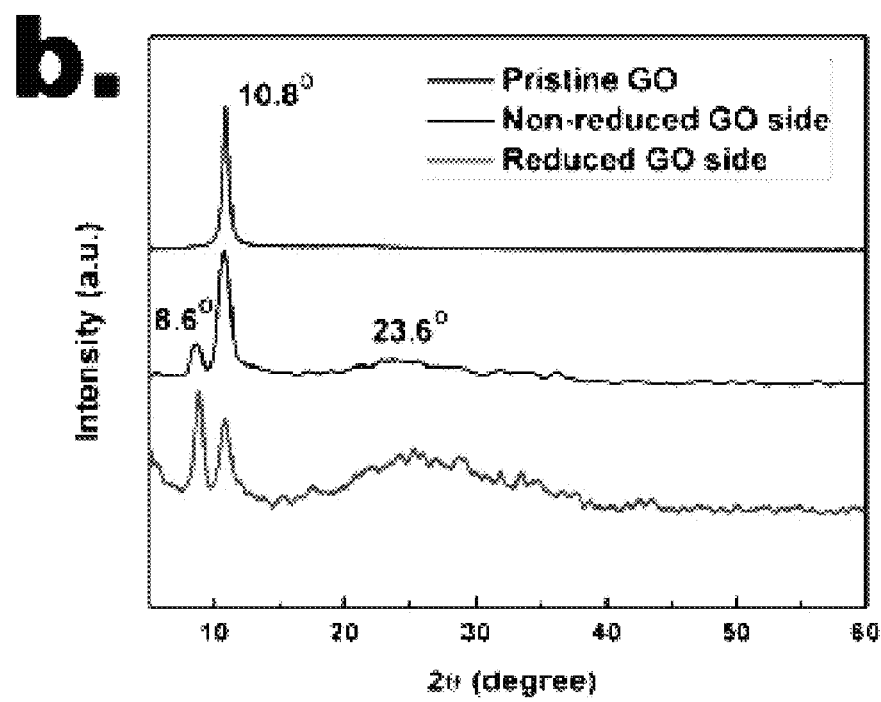
FIG. 2B. Structural characterization of pristine GO and FGG film reduced on Zn using XRD patterns.

The differential reduction of FGG films was further evidenced by X-ray diffraction spectroscopy (XRD) which is shown in FIG. 2B. Pristine GO possess a characteristic peak at 10.88° with d-spacing of 0.81 nm, attributable to the presence of oxygen-containing functional groups separating the graphitic layers. Three distinct diffraction peaks corresponding to the (002) basal plane are present on the non-reduced side at around 2θ=8.6°, 10.75°, and 23.65° with d-spacings of 1.03 nm, 0.82 nm, and 0.37 nm, respectively. In contrast, the reduced side exhibits diffraction peaks at 8.84° (d-spacing=0.99 nm), 10.88° (0.81 nm), and 24.32°

(0.36 nm). The highest intensity peak)(10.75° on the non-reduced side of FGG with an expanded interlayer distance (0.82 nm) was attributed to the oxygen containing functional groups and intercalated water between the GO sheets. The opposing side of the FGG film still exhibits this peak but at a significantly reduced intensity in comparison to other prominent peaks at 8.84° and 24.32°. The broader peak at 24.32° corresponds to an interlayer spacing of 0.36 nm, which is close to pristine graphite's interlayer spacing of 0.335 nm. The highest intensity diffraction peak on the reduced GO side occurs at 8.84° (d-spacing=0.99 nm), which corresponds to the intercalation of metal ions between the GO sheet basal planes. The increase of interlayer distance from 0.81 nm (pristine GO peak) to 0.99 nm is strong evidence for intercalating metal ions in between GO sheets.

Figure 2C:
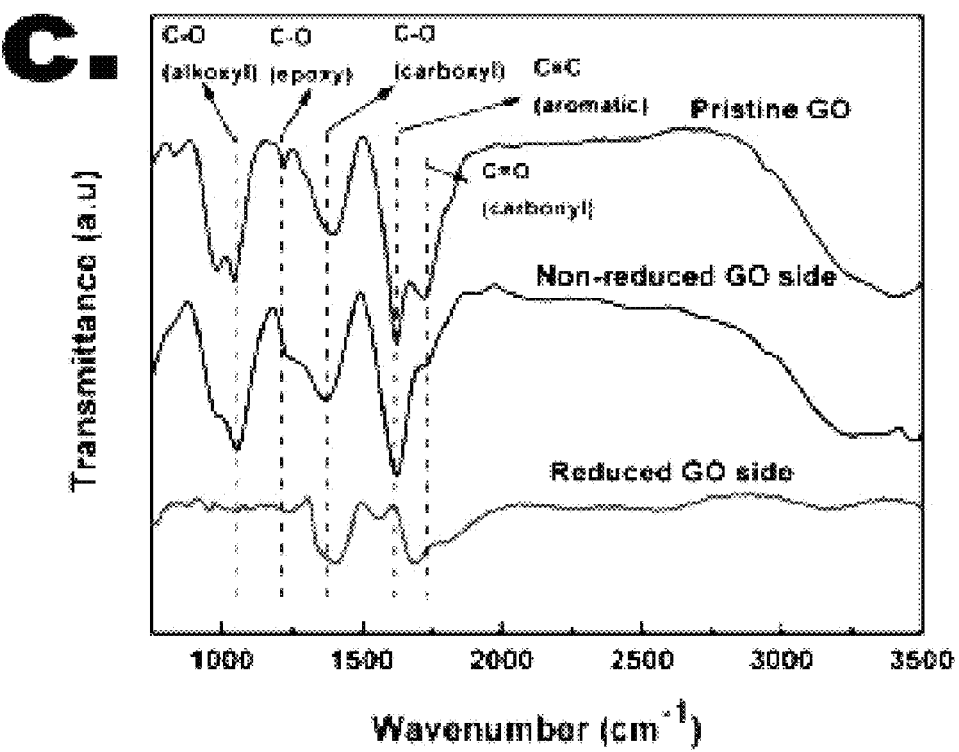
FIG. 2C. Structural characterization of pristine GO and FGG film reduced on Zn using FTIR spectra FIG. 2D. Structural characterization of pristine GO and FGG film reduced on Zn using XPS spectra (non-reduced GO side).

The chemical structures of both reduced and non-reduced sides of FGG films were studied by FTIR spectroscopy (FIG. 2C). The FTIR spectra of pristine GO shows various functional groups, for example, alkoxyl C—O (1045 $cm^{-1}$), epoxy C—O (1222 $cm^{-1}$), carboxyl C—O (1400 $cm^{-1}$), aromatic C=C (1620 $cm^{-1}$), carboxyl C=O (1724 $cm^{-1}$) and hydroxyl C-OH (3410 $cm^{-1}$). The non-reduced side of FGG film exhibited all the peaks except epoxy peak in the FTIR spectrum, indicating the presence of oxygen-containing functional groups. In contrast, most of the peaks, including the alkoxyl C—O, epoxy C—O and hydroxyl C—OH, disappeared from the reduced side of FGG film indicating significant reduction of oxygen-containing functional groups. The presence of carboxyl C—O peaks at 1412 $cm^{-1}$ on both sides of the FGG indicates their involvement with metal ions cross-linking.

Figure 2D:
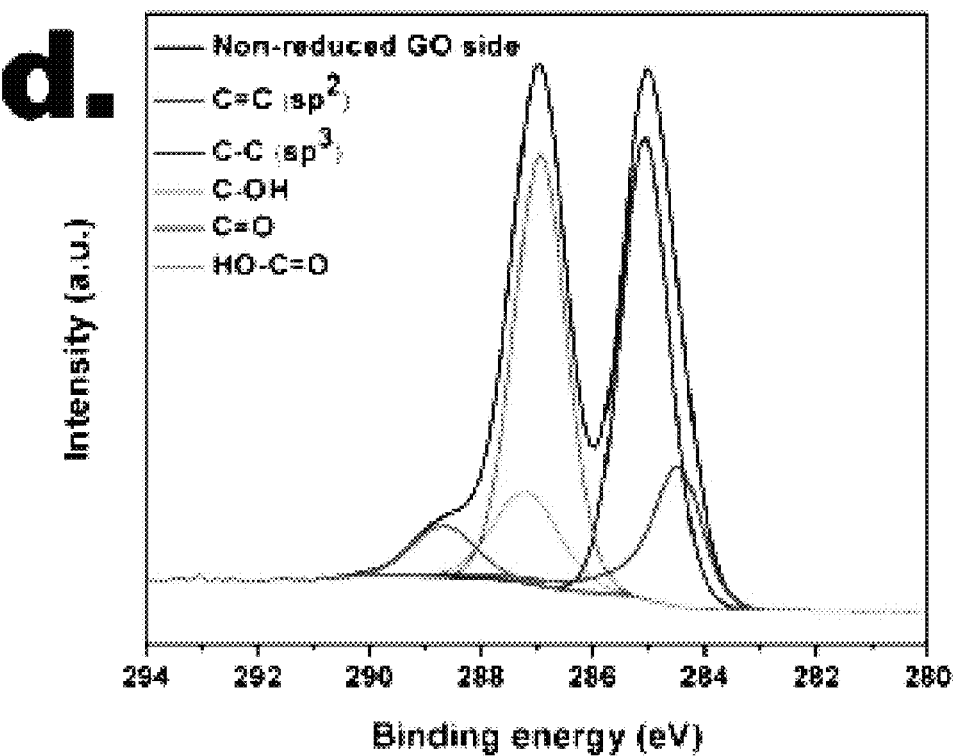
FIG. 2E. Structural characterization of pristine GO and FGG film reduced on Zn using XPS spectra (reduced GO side).
FIG. 2F. SEM image of the surface morphology of reduced side of FGG film on Zn.
FIG. 2G. SEM image of the surface morphology of non-reduced side of FGG film on Zn.
FIG. 2H. Cross-sectional SEM image and elemental mapping of Zn of Zn-rGO film.
Figure 2E:
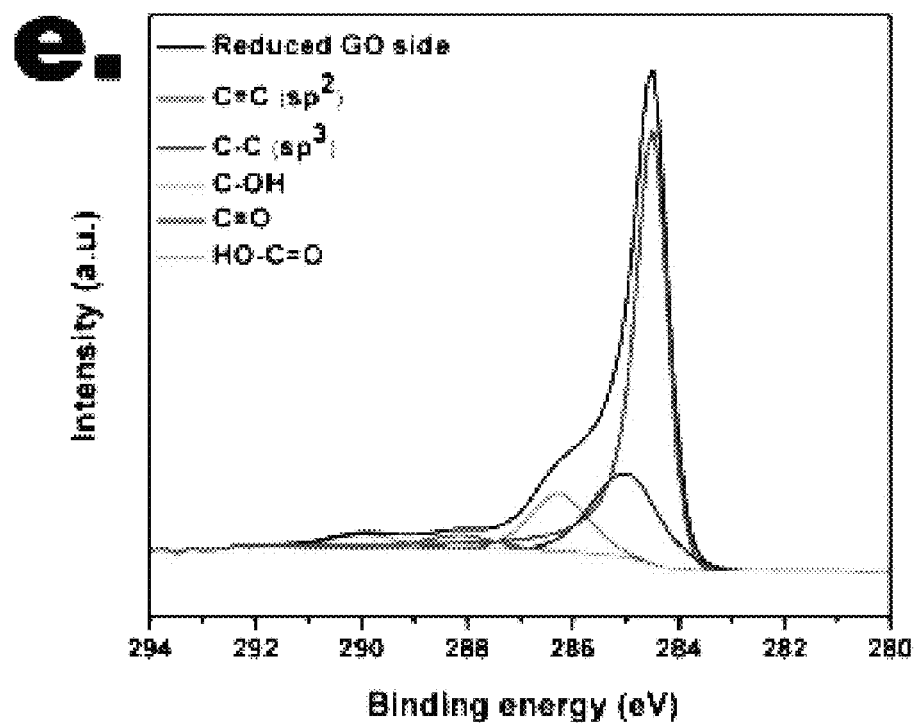

The reduction characteristics of FGG films on Zn metal were also examined by X-ray photoelectron spectroscopy (XPS). The high-resolution C1s spectrum of the films (FIG. 2D and FIG. 2D) shows that the oxygen-containing functional groups have been eliminated preferentially on the reduced side of the film that was in contact with the metal. Five different peaks corresponding to C=C (~284.4 eV, $sp^2$), C—C (~285.0 eV, $sp^3$), C—O (286.9 eV, hydroxyl and epoxy), C=O (~288.6 eV, carbonyl), and HO—C=O (287.2 eV, carboxyl) were observed on the non-reduced side of FGG film. The reduction of FGG film on Zn metal side revealed that the oxygen functional groups were significantly eliminated and the $sp^2$ carbon structure was restored. As seen in the Table in FIG. 14, the non-reduced side of FGG was composed of 37% $sp^3$ and 10% $sp^2$ carbon networks. In contrast, the $sp^2$ carbon networks dominated (54.6%) the composition of the opposite (reduced side) with a significant decrease in the $sp^3$ carbon networks (23.7%). The decreased presence of C—OH, C=O, and HO—C=O functional groups on the reduced side is also notable. In addition, the relative ratio of C/O improved from 2.5 for non-reduced side to 3.4 for reduced side of Zn-rGO film (see Tables in FIG. 14 and FIG. 15). Taken together with the Raman, XRD, and FTIR observations, the XPS results show that the elimination of oxygen-containing functional groups and restoration of conjugated π structure are not uniform throughout the film, resulting in a functionally graded conductive rGO and insulating GO structure in a single film.

Figure 2F:
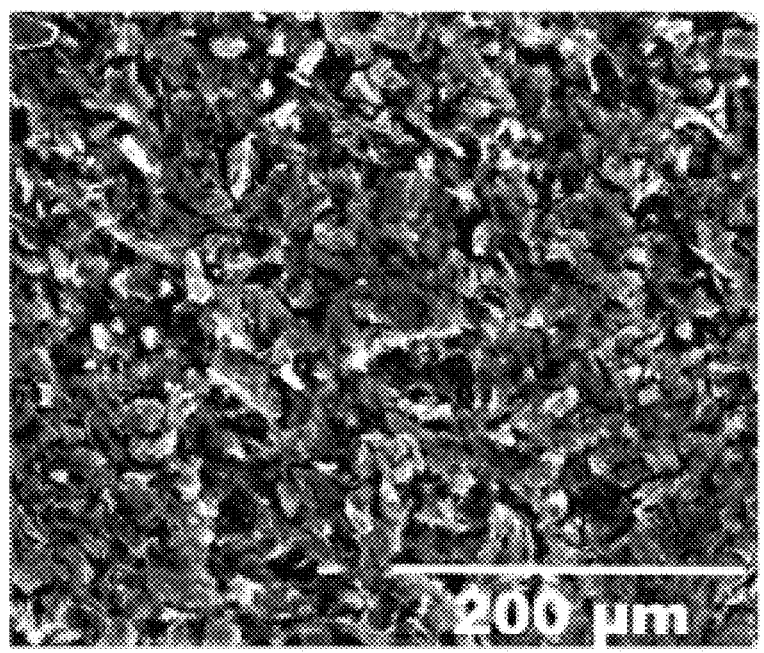
Figure 2G:
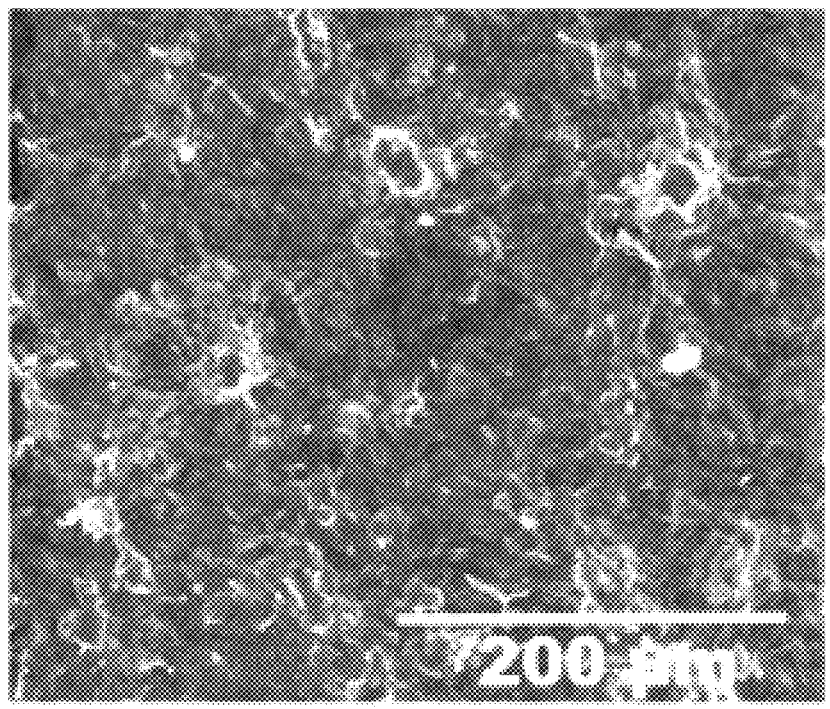
Figure 2H:
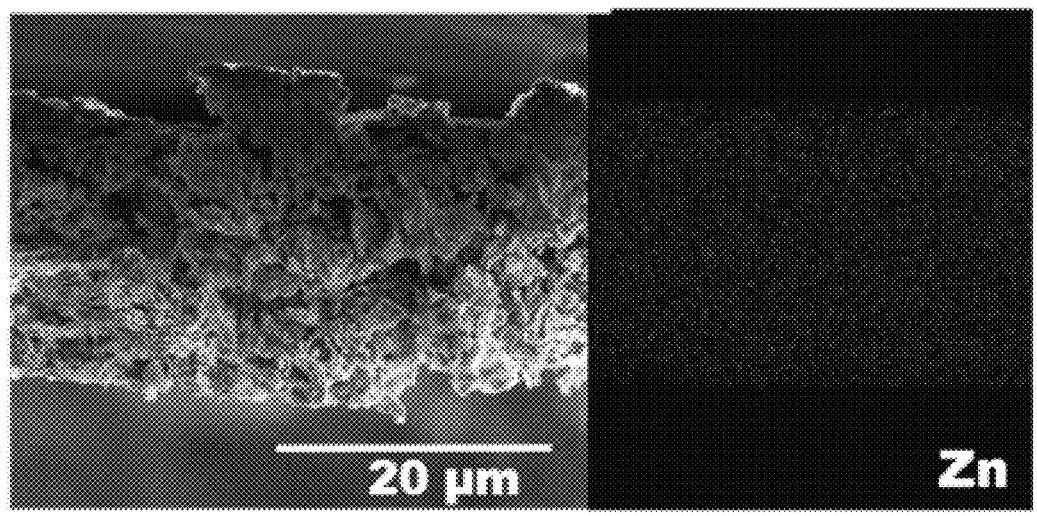

Microscopy investigation using SEM reveals that the rGO side of FGG film had a porous surface (FIG. 2F), whereas, the surface morphologies on the non-reduced side were relatively smooth (FIG. 2G).

The smooth and uniform GO sheets at the top surface are believed to due to fast drying process of GO starts from the top (non-contact) surface, by the meantime, the reduction of GO might not have reached completion at the top layers of the FGG films, depending on the drying rate, the coating thickness, and the concentration of GO. The porous graphene microstructure at the metal interface is believed to have resulted from nascent hydrogen formation at the interface of metal and GO. The cross-sectional image of FGG film on zinc (FIG. 2G) indicate a well-packed layered microstructure of graphene and graphene oxide sheets. The EDX-based elemental mapping reveals that atomic zinc is well distributed throughout the film. These results along with XRD confirm metal-graphene coupling throughout the FGG film.

Figure 3A:
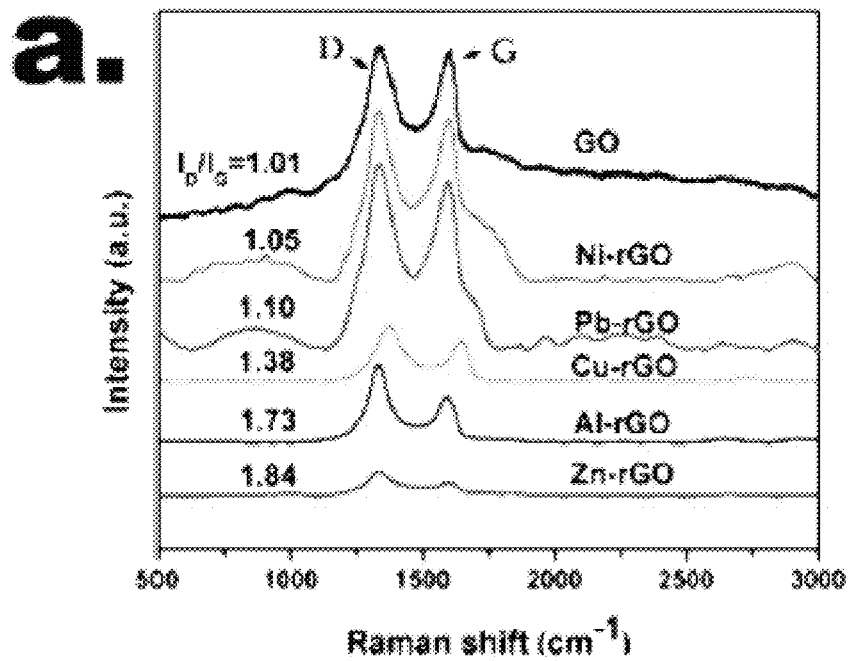
FIG. 3A. Raman spectra of GO, and reduced side of Ni-rGO, Pb-rGO, Cu-rGO, Al-rGO, and Zn-rGO films.

The reduction of GO is associated with the electrons lose and gain on the active metals and GO, respectively. Therefore, the recovery of conjugated π electrons may be varied on different metal substrates based on their reduction potential values. To investigate the reduction level of GO, the conductive face (touching face of the metal surface) of FGG films reduced on Zn, Al, Pb, Ni, and Cu and compared with pristine GO were characterized. The Raman spectra of reduced graphene oxide at the interface of various metallic substrates is shown in FIG. 3A. Pristine GO films dried on an inert substrate (kapton tape) possess a D band at 1336 $cm^{-1}$ and a G band at 1604 $cm^{-1}$, whereas, Ni, Pb, Cu, Al, and Zn metals assisted rGO exhibit G band at Raman shifts of 1601 $cm^{-1}$, 1599 $cm^{-1}$, 1595 $cm^{-1}$, 1587 $cm^{-1}$, and 1595 $cm^{-1}$, respectively. The red-shifting of the G band shows the development of in-plane $sp^2$ carbon domains. Compared to pristine GO films, the intensity ratios of D band to G band for various metals assisted rGO were increased. Moreover, the Zn-rGO film showed the highest intensity ratio ($I_D/I_G$=1.84) as compared to other metals assisted reduced films implies that significant amount of oxygen-containing functional groups had been removed by Zn metal.

Figure 3B:
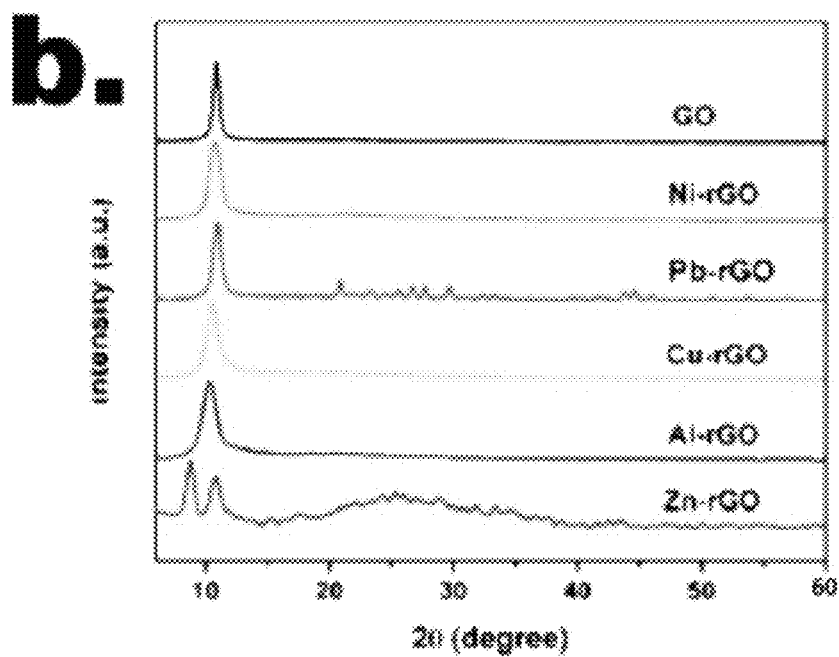
FIG. 3B. XRD patterns of GO, and reduced side of Ni-rGO, Pb-rGO, Cu-rGO, Al-rGO, and Zn-rGO films.

FIG. 3B illustrates the normalized XRD patterns of GO and rGO reduced on various active metals. In contrast, Ni-rGO, Pb-rGO, Cu-rGO, Al-rGO, and Zn-rGO samples exhibited a relatively lower intensity peaks at 10.5°, 11.0°, 10.5°, 10.3°, and 10.8°, respectively corresponded to GO interlayer separation. The presence of these peaks in XRD patterns indicates that the reduction process was not completed. In addition, all the reduced GO samples showed a broader peak between 20° to 25° corresponding to significantly lower interlayer distance (~0.4 nm), which indicates that the graphitic structure was partially reestablished. At the same time, an additional peak at 8.8° (d-spacing 0.99) appears, which corresponds to the crosslinking of metal ions within the graphitic layers of the Zn-rGO sample. This peak was not noticeable in the XRD pattern of other reduced samples because the corresponding metal contents were drastically low (less than 1.5 atomic percentage), compared to the Zn-rGO films, which were composed of around 4.4 atomic percentage of Zn elements (see Table in FIG. 15). The peaks at 23.3°, 25.5°, 26.8°, 27.7°, 29.7°, 43.8°, and 44.6° on Pb-rGO sample corresponded to PbO that became transferred to the FGG films.

Figure 3C:
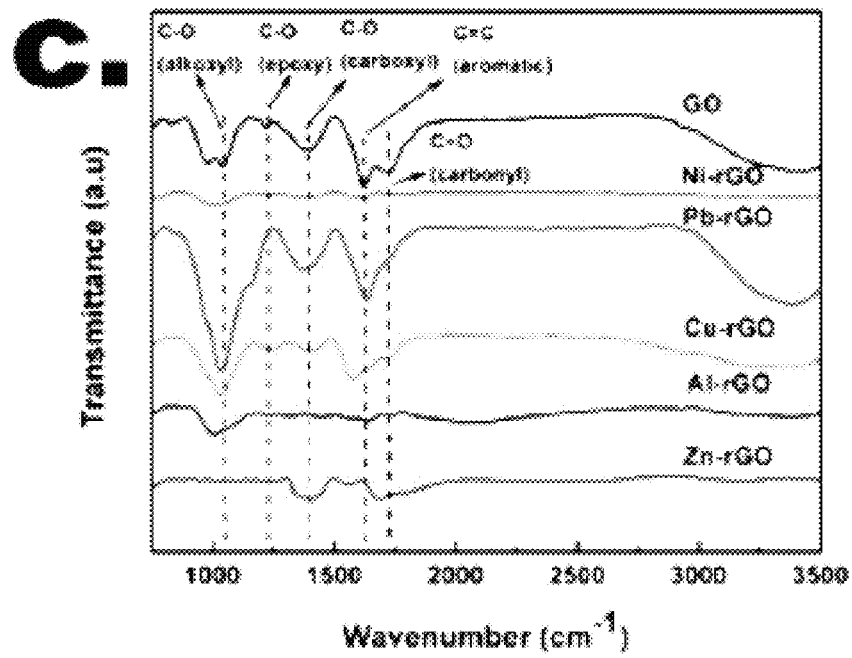
FIG. 3C. FTIR spectra of GO, and reduced side of Ni-rGO, Pb-rGO, Cu-rGO, Al-rGO, and Zn-rGO films.
Figure 3D:
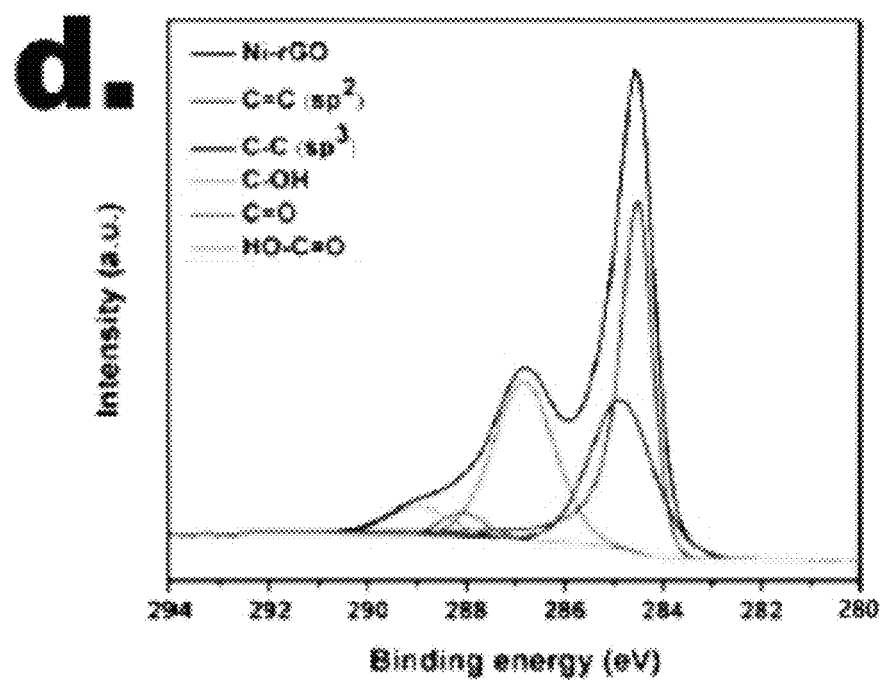
FIG. 3D. High resolution of Cls peaks of reduced side of FGG film produced on Ni foil in comparison with GO.
Figure 3E:
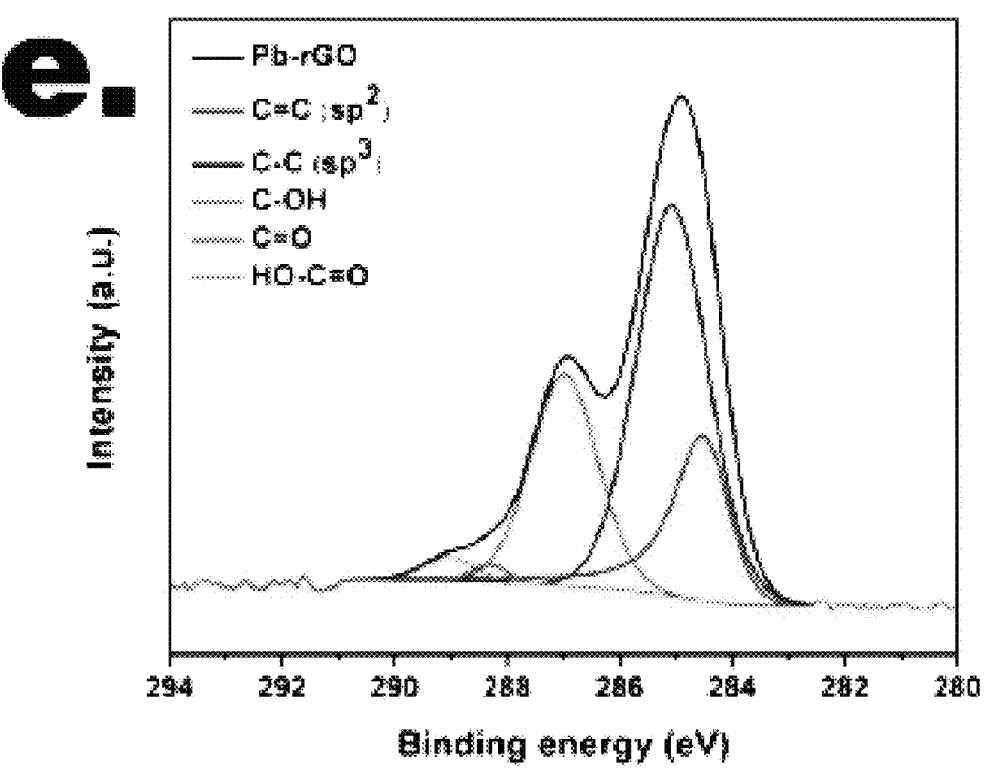
FIG. 3E. High resolution of Cls peaks of reduced side of FGG film produced on Pb foil in comparison with GO.
Figure 3F:
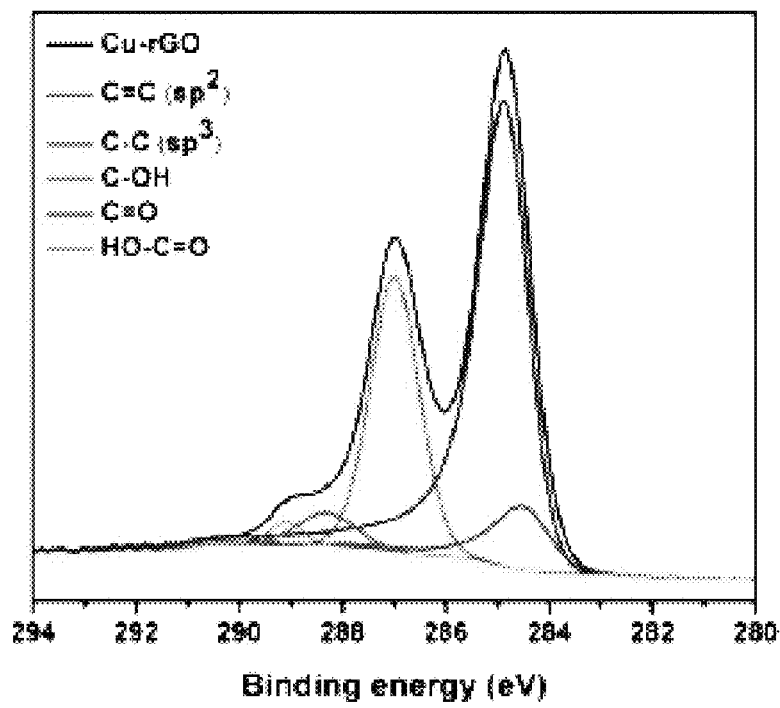
FIG. 3F. High resolution of Cls peaks of reduced side of FGG film produced on Cu Al foil in comparison with GO.
Figure 3G:
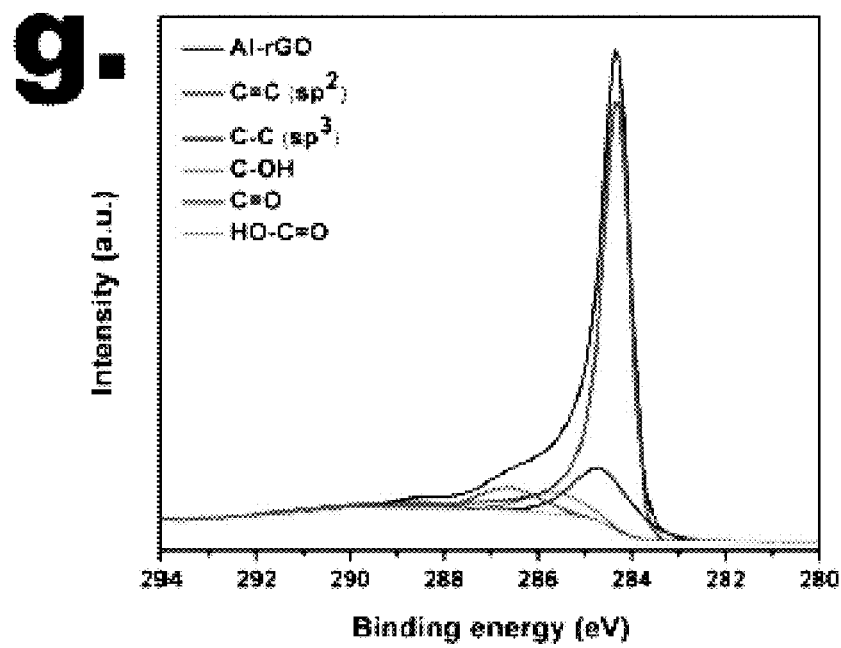
FIG. 3G. High resolution of Cls peaks of reduced side of FGG film produced on Al foil in comparison with GO.

FTIR spectroscopy analysis (FIG. 3C) further confirmed the existence of oxygen-containing groups of alkoxyl C—O, epoxy C—O, carboxyl C—O, aromatic C=C, carboxyl/carbonyl C=O, and hydroxyl C—OH stretches at 1045 $cm^{-1}$, 1222 $cm^{-1}$, 1400 $cm^{-1}$, 1620 $cm^{-1}$, 1724 $cm^{-1}$, 3410 $cm^{-1}$, respectively on the GO film. However, the carbonyl C=O function group disappeared or showed lower intensities upon the reduction of GO while increasing the carboxyl C—O stretch intensities, indicating interactions of metal ions covalently linking with graphene sheets. The relative intensity of the epoxy C—O stretch at 1222 $cm^{-1}$ was significantly decreased after the reduction of GO using various metals indicating the removal of the functional group at the basal plane and recovery of the graphitic sp² structure. A strong hydroxyl peak at around 3400 cm⁻¹ was observed on Pb-rGO and Cu-rGO films which is also confirmed by XPS.

By measuring the kinetic energy of electrons from the surface with a maximum resolution of 10 nm, the XPS offers a realistic picture of microstructures of the film. The C1s spectra of the reduced side of Al-rGO, Cu-rGO, Pb-rGO, and Ni-rGO film is illustrated in FIGS. 3D-3G. Five separate peaks at around 284.5 eV, 285.0 eV, 286.9 eV, 288.1 eV, and 289.0 eV that represent C=C (sp²), C—C (sp³), C—O (hydroxyl and epoxy), C=O (carbonyl), and HO—C=O (carboxyl), respectively, were identified for the various films prepared. The spectrums indicate that the majority of the functional groups of GO had been significantly removed at the active metal interface and that then-conjugated structure was recovered. The Al-rGO film consisted of 63.5% of sp² networks and the reduction of other functional groups were also noticeable on the reduced side (see Table in FIG. 14). However, the sp³ carbon networks, as well as the C—OH groups were prominent in the Cu-rGO, Pb-rGO, and Ni-rGO films indicating that the elimination of oxygen-containing functional groups by Pb, Ni, and Cu was less effective. The atomic percentage was 4.4 for Zn, 0.7 for Al, 3.1 for Pb, 0.4 for Ni, and 0.0 for Cu on the reduced side of Zn-rGO, Al-rGO, Pb-rGO, Ni-rGO, and Cu-rGO film, respectively (see Table in FIG. 15).

Figure 3H:
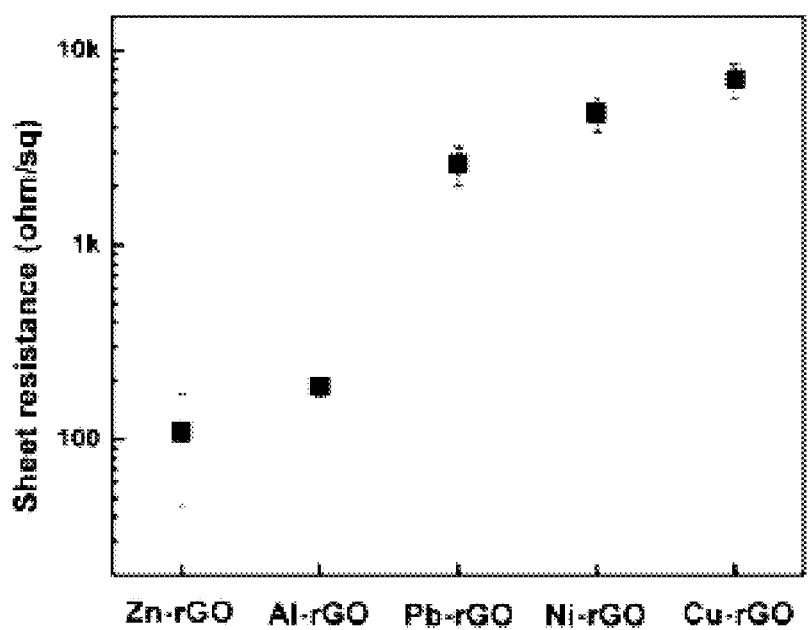
FIG. 3H. Sheet resistance of Ni-rGO, Pb-rGO, Cu-rGO, Al-rGO, and Zn-rGO films.
Figure 4A:
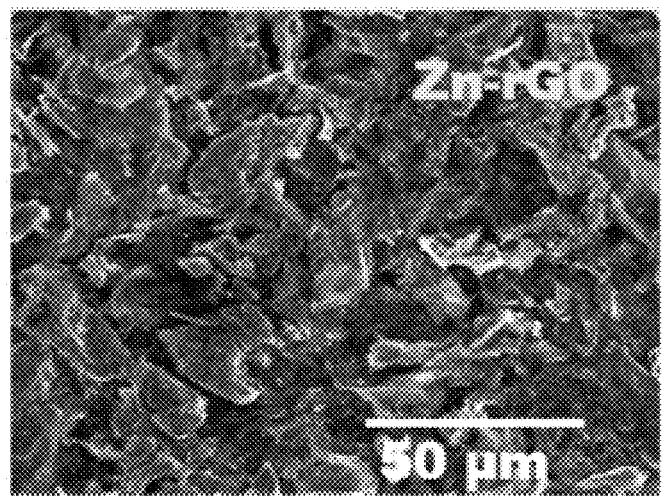
FIG. 4A. SEM images of reduced side of FGG film developed on Zn substrates.
Figure 4B:
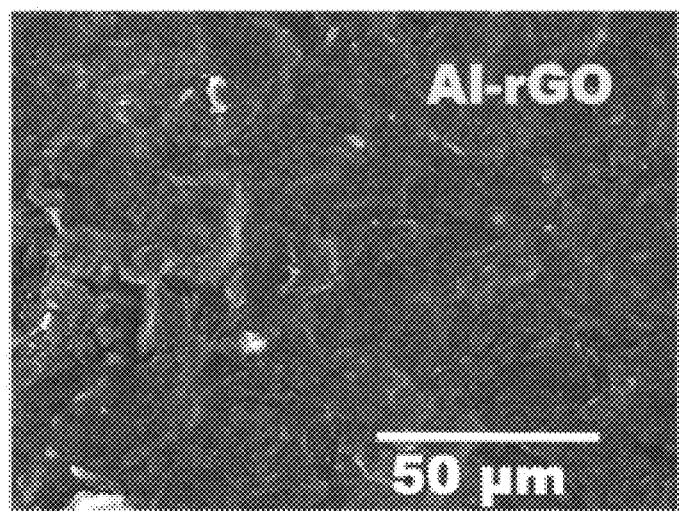
FIG. 4B. SEM images of reduced side of FGG film developed on Al substrates.
Figure 4C:
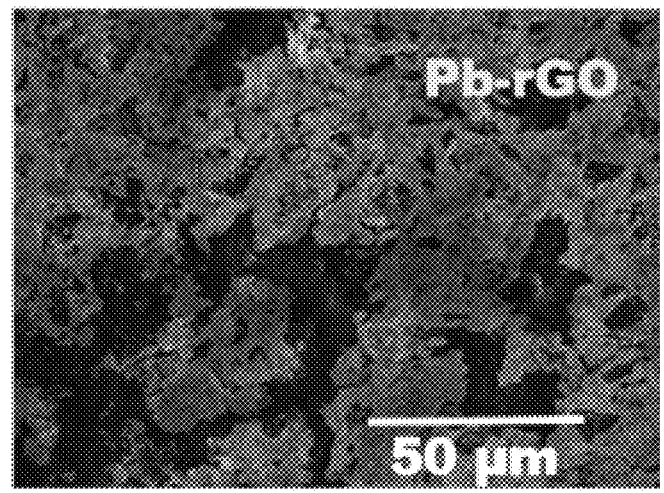
FIG. 4C. SEM images of reduced side of FGG film developed on Pb substrates.
Figure 4D:
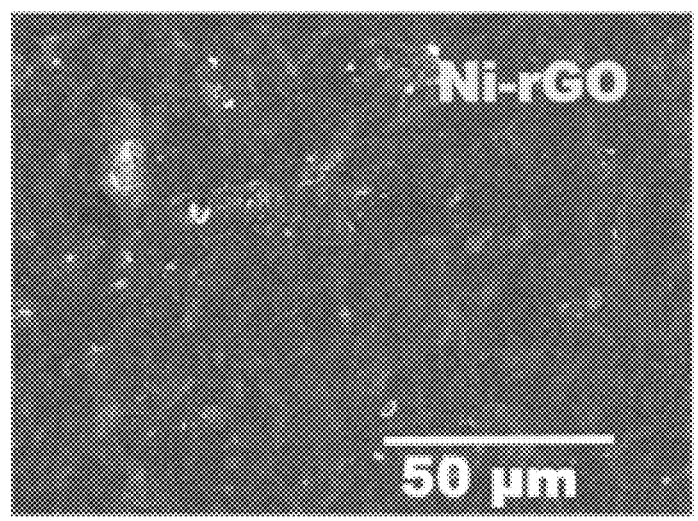
FIG. 4D. SEM images of reduced side of FGG film developed on Ni substrates.
Figure 4E:
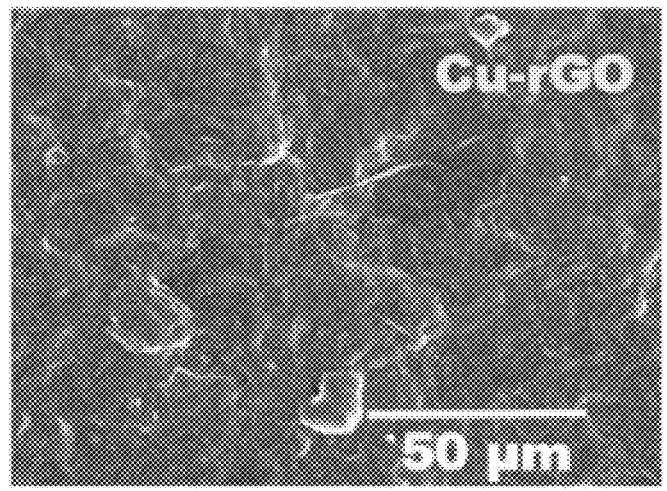
FIG. 4E. SEM images of reduced side of FGG film developed on Cu substrates.

A 300 μm thickness of GO paste with a concentration of 50 mg/mL was deposited on Zn, Al, Pb, Ni, and Cu substrates using a doctor blade and air dried the entire assembly at 50° C. and 60% relative humidity. After peeling-off, the film thickness was measured 87 μm, 46 μm, 31 μm, 22 μm, and 26 μm for Zn, Al, Pb, Ni, and Cu, respectively. A plot of sheet resistance, measured using a 4-point probe, is shown in FIG. 3H for the reduced, metal-contact side of various FGG films. The lowest sheet resistance of 108.7 ohm/□ was observed on Zn-rGO film followed by Al-rGO (187.7 ohm/□), Pb-rGO (2600.2 ohm/□), Ni-rGO (4782.5 ohm/□), and Cu-rGO (7095.1 ohm/□) film. The lower values of sheet resistance, along with Raman, XRD, FTIR, and XPS results, prove that the elimination of oxygen functionalities from the Zn-rGO film was significantly higher than that of other metals assisted reduced films. The standard reduction potential of Al/Al³⁺, $^{Zn}$/Zn²⁺, Ni/Ni²⁺, Pb/Pb²⁺, and Cu/Cu²⁺ is −1.66 V, −0.76 V, −0.26 V, −0.13 V, and 0.34 V, respectively vs SHE, and the reduction potential of GO is about −0.4 V vs SHE in solution of pH 4.

Figure 9A:
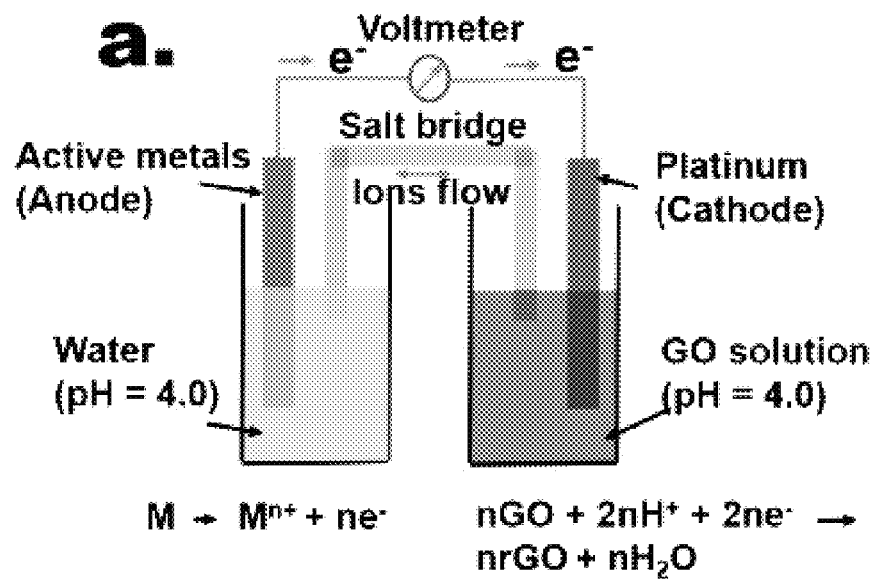
FIG. 9A. Schematic illustration of a model voltaic cell.
Figure 9B:
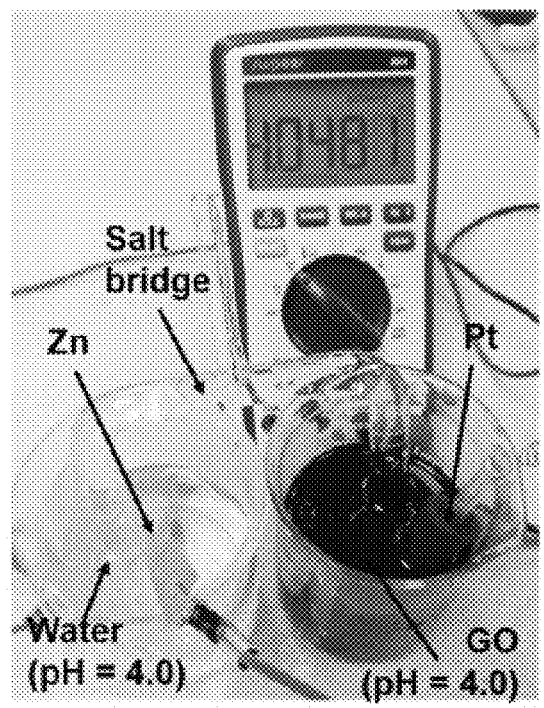
FIG. 9B. Image of an experimental setup of voltaic cell.

Based on standard potential values, the Al substrate should reduce GO more effectively and consequently, it should have the lowest sheet resistance than other metals. The Table in FIG. 14 shows that the sheet resistance of Al was higher than Zn, similarly, Ni showed higher value of sheet resistance than Pb. In order to elucidate the reduction mechanism of FGG film, designed a voltaic cell with electrolyte of pH 4.0 (see FIGS. 9A-9B) was designed. The redox reactions can be divided into two half reactions:

Anode: M=M$^{n+}$+ne⁻
Cathode: nGO+2nH⁺+2ne⁻=nrGO+nH₂O
Total Redox: nGO+2nH⁺+M=nrGO+M$^{n+}$+nH₂O The overall reduction potential of various metal substrates in the custom cell is listed in the Table in FIG. 14. Zinc showed the lowest reduction potential of −1.09 V among the listed metals, followed by Al (−0.76 V), Pb (−0.50 V), Ni (−0.36 V), and Cu (−0.12 V). A lower reduction potential shows a greater driving force for Zn to lose electrons to the GO, hence showing a more effective reduction of GO using the Zn metal substrate.

The overall reduction potentials of the metal substrates tested in the custom cell are listed in the Table below. Zinc was found to have the lowest reduction potential of −1.09 V among the listed metals, followed by Al (−0.76 V), Pb (−0.50 V), Ni (−0.36 V), and Cu (−0.12 V). The greater reduction potential of Al (in comparison to Zn) is attributed to the well-known passivating behavior of Al. A lower reduction potential show a greater driving force for Zn to lose electrons to the GO, hence, explaining the more effective reduction of GO observed using the Zn metal substrate.

TABLE

Properties of FGG films* and Pristine GO

| Sample | C/O ratio | ID/IG ratio | Sheet resistance (ohm/□) | Reduction potential (V) |
|---|---|---|---|---|
| Zn-rGO | 3.4 | 1.84 | 109 ± 64 | −1.09 ± 0.04 |
| Al-rGO | 6.5 | 1.73 | 188 ± 21 | −0.76 ± 0.04 |
| Pb-rGO | 2.6 | 1.10 | 2600 ± 596 | −0.50 ± 0.01 |
| Ni-rGO | 3.6 | 1.05 | 4783 ± 995 | −0.36 ± 0.03 |
| Cu-rGO | 3.1 | 1.38 | 7095 ± 1485 | −0.12 ± 0.02 |
| Pristine GO | 2.3 | 1.01 | — | — |

*All measurements were made on the reduced side of the FGG films.

Figure 19A:
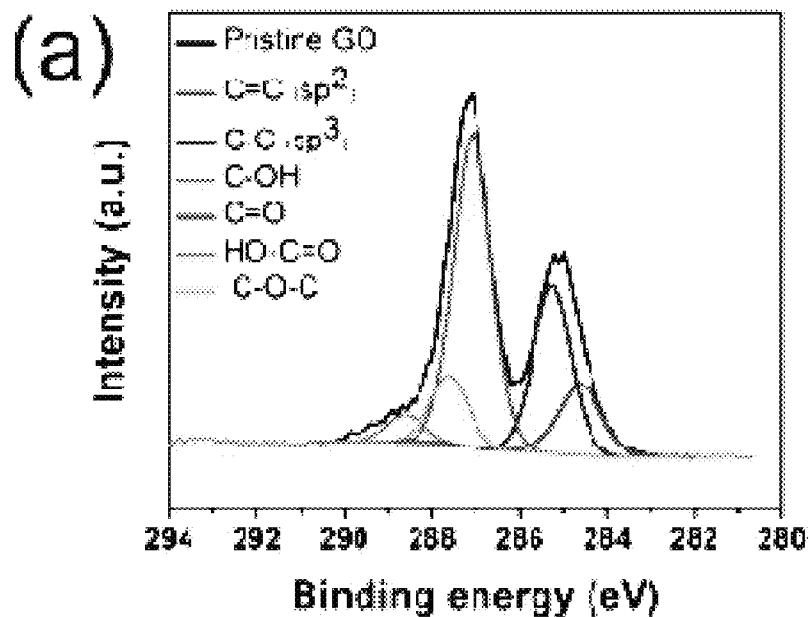
FIG. 19A-19E. C1s spectra of pristine GO (FIG. 19A); the non-reduced side (FIG. 19B); the transition region (FIG. 19C); the reduced side of Zn-FGG film (FIG. 19D); and, the reduced side of the Al-FGG film (FIG. 19E).
Figure 19B:
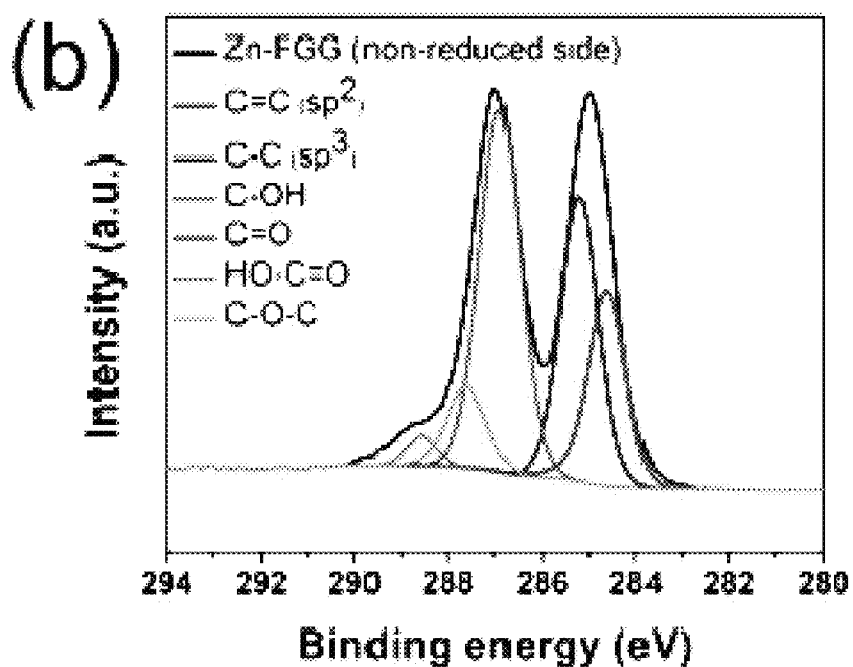
Figure 19C:
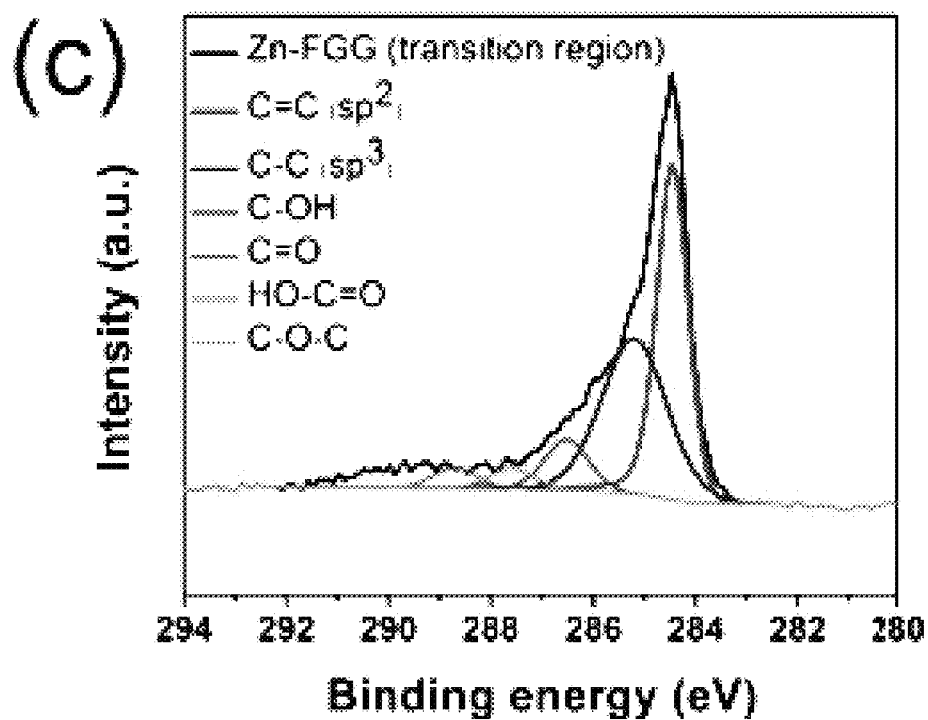
Figure 19D:
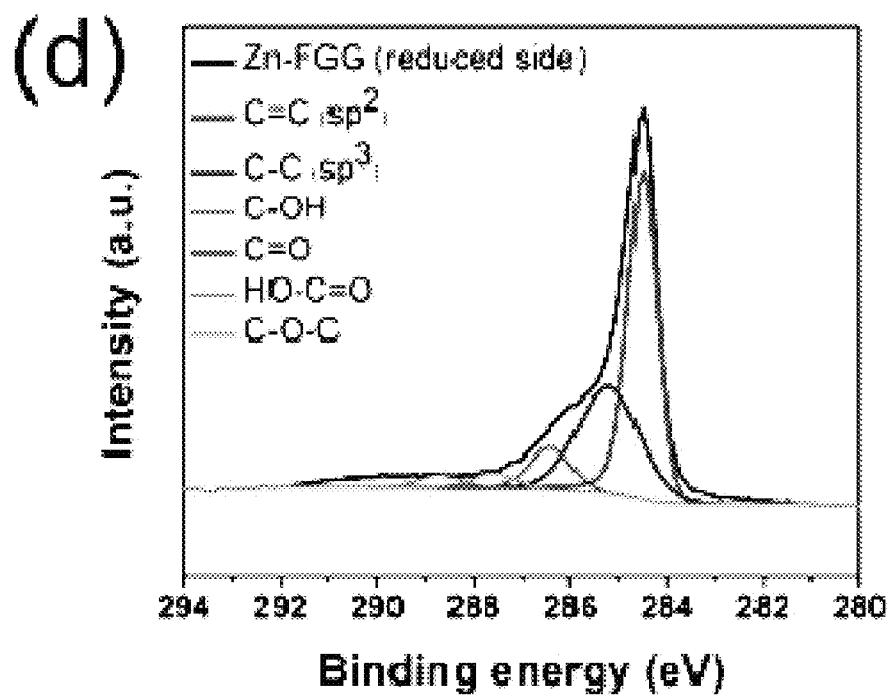
Figure 19E:
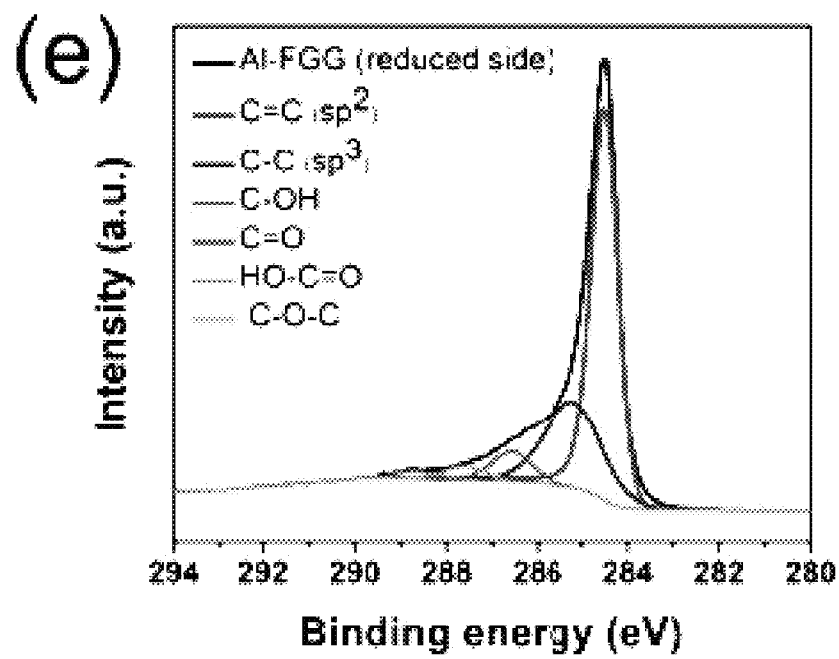
Figure 19F:
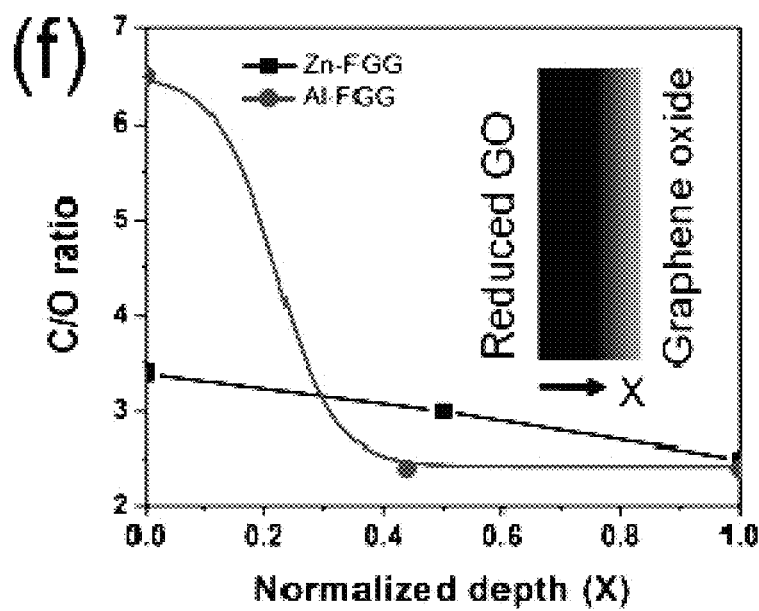
FIG. 19F. Carbon to oxygen ratio as a function of depth of FGG films reduced on Zn and Al showing graphene networks can be tuned in a controlled manner.

The precise chemical composition of pristine GO and FGG films reduced on the different active metals were analyzed using X-ray photoelectron spectroscopy (XPS) (FIGS. 19 and FIG. 3D-3G) with the results summarized in the Table in FIGS. 15, 16, 17 and 18. High-resolution scans of the C1s region reveal the relative abundance of sp² (284.5±0.1 eV), sp³ (285.3±0.1 eV), C—OH (287.1±0.1 eV), C—O—C (287.7±0.1 eV), and COOH (288.6±0.1 eV) groups. The relative area of the deconvoluted peaks was used to determine the relative atomic abundance of each orbital/moiety, where an abundance of sp² carbon relative to sp³ carbon and to other functional groups implies a higher degree of reduction/deoxygenation, respectively Films reduced on a zinc substrate show markedly different oxygen functionalities on either opposing sides (FIG. 19B, FIG. 19C, FIG. 19D, FIG. 17). The spectra corresponding to the side in contact with the metal substrate (Zn-rGO) shows few oxygen functionalities (FIG. 19D), whereas the air-exposed side of the film is abundant in oxygen functionalities, indicative of minimally reduced GO (FIG. 19B). FIG. 19E shows the C1s spectra of the reduced side of the Al-FGG film.

Survey scans (0 eV-1204 eV) provide relative atomic percentages of metals, carbon and oxygen in each sample as well as film cross-sections. The fully oxygenated film precursor (pristine GO) has a carbon to oxygen ratio (C:O) of approximately 2.3:1 (FIG. 15), which can be contrasted with the C:O ratios measured through the profile of the Zn-FGG film. In the Zn-FGG films, the C:O ratio was determined to be approximately 2.5:1 for Zn-GO (non-reduced side), 3.02:1 for the transition region, and 3.4:1 for Zn-rGO (reduced side) (FIG. 19F and FIG. 15), thus indicating an asymmetric degree of deoxygenation across the film. Taken together with the Raman, XRD, and FTIR observations, the XPS results show that the elimination of oxygen-containing functional groups and the restoration of the π-conjugated structure are not uniform throughout the film, resulting in a functionally graded conductive rGO and insulating GO distribution within a single film. The graded graphene networks in the FGG films can be tailored through control of the underlying metal substrates as well as the film's drying environment. As shown in FIGS. 19A-FIG. 19F and FIGS. 3D-3G, all films reduced on Al, Pb, Cu, and Ni undergo reduction from contact with the metal foil as indicated by the increase in $sp^2$ carbon at ~284.5 eV and the decrease in $sp^3$ carbon as well as oxygen functional groups corresponding to the peaks at 285.5 eV to 289.0 eV (See FIG. 15 and FIG. 16). This deoxygenation trend directly corresponds to the reduction potential of the metals as observed from the galvanic cell experiments. The survey scans also show the amount of metal ions that was dispersed throughout the film during the reduction process (FIG. 15 and FIG. 16), which as discussed earlier was significantly higher for Zn (4.4 at %) vs. the other metals (e.g., Al—0.7 at %).

FIGS. 4A-4E show the SEM micrographs of reduced GO on Zn, Al, Pb, Ni, and Cu substrate, respectively. A relatively smooth surface was observed on Ni-rGO, Cu-rGO, and Al-rGO films, while a porous graphite network was noticed on Zn substrate. The porous structure may be attributed to the formation of nascent hydrogen at the interface of Zn and GO. Metallic Zn is known to vigorously react with acidic environments and generate $H_2$ bubbles, which would template out a porous structure within the rGO film. To demonstrate this concept, we immersed all the substratesin a 0.1M HCl acid (of pH 1) for 10 minutes at 25° C. and found only the Zn substrate covered with hydrogen bubbles (see FIG. 10).

An oxide layer was observed on Pb-rGO film (FIG. 4C), which was further confirmed by XRD (FIG. 3B).

After releasing electrons from the lead, the positively charged lead ions ($Pb^{2+}$) would react with the oxygen and form lead oxide (PbO). The bilayer-like arrangement of the GO and rGO structures in these FGG films is evident by their differential swelling behavior when immersed in water. GO is highly hydrophilic and rapidly swells by absorbing water, whereas rGO, without the oxygen moieties, is hydrophobic and repels water.

As can be seen in FIG. 11A, Al-rGO, Pb-rGO, Ni-rGO, and Cu-rGO FGG films curled when they were submerged into distilled water, proving the presence of bilayer-like arrangement. The increased volume of GO through water absorption on the non-reduced side concomitant with a poor absorption on the rGO side causes the FGG films to macroscopically curl. The curling effect was not observed on Zn-rGO film, which are due to the high density of Zn cross-links throughout the film combined with its porous structure.

The bilayer-like arrangement of the GO and rGO structures in these FGG films is evident by their differential swelling behavior when immersed in water. GO is highly hydrophilic and rapidly swells by absorbing water, whereas rGO, without the oxygen moieties, is hydrophobic and repels water. As can be observed Al-FGG, Pb-FGG, Ni-FGG, and Cu-FGG films curl when they are submerged in distilled water (FIG. 11A), indicating the presence of bilayer-like arrangements originating from the graded structure. The increased volume of GO through water absorption on the non-reduced side concomitant with a poor absorption on the rGO side causes the FGG films to macroscopically curl. The curling effect is not observed with the Zn-FGG films, which is believed to be due to the high density of Zn cross-links throughout the film combined with its porous structure.

Figure 20A:
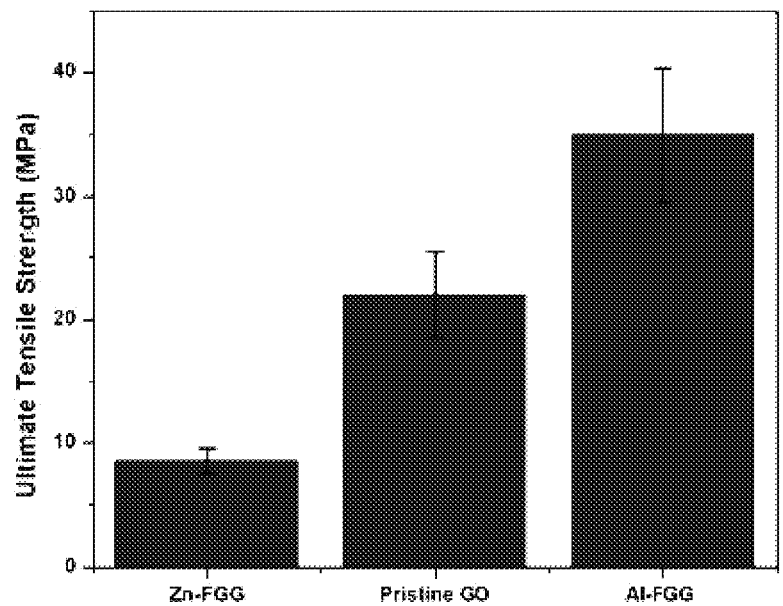
FIGS. 20A-20C: Mechanical Properties of Pristine GO films and functionally graded films coated on Aluminum and Zinc substrate.
Figure 20B:
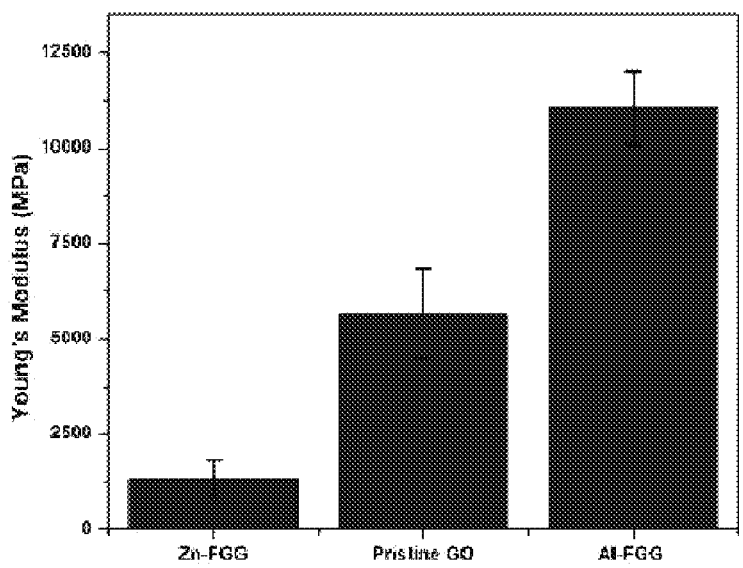
Figure 20C:
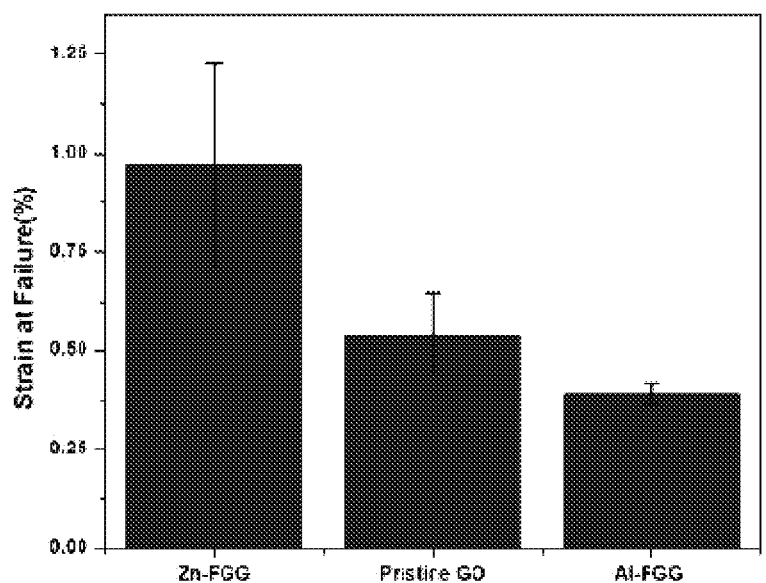

The FGG films are mechanically robust and flexible and can be cut into slender strips that display hygro-morphism—a shape-deformation in the presence of a moist environment. Hygro-morphism is also observed in nature, e.g., in the case of pine-cones that respond to changes in the surrounding humidity. Increase in the mechanical strength and flexibility of the FGG films upon reduction is evident through their response to the dynamic stress-strain tests. (FIGS. 20A, FIG. 20B, FIG. 20C). The ultimate tensile strength of pristine GO films increased by 65% after reduction on an aluminum substrate, making them ideal for hygro-morphic actuation.

Figure 11C:
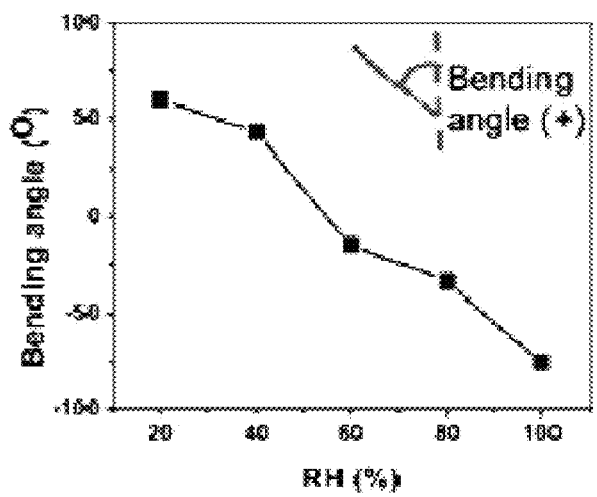
FIG. 11C. The bending angle of an FGG actuator as a function of RH.
Figure 12A:
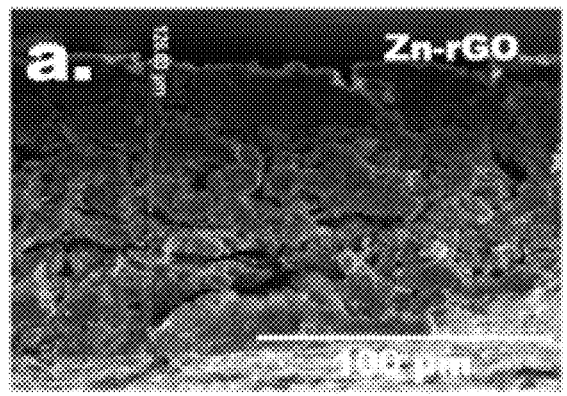
FIG. 12A. Cross-sectional SEM images of FGG films reduced on Zn.
Figure 12B:
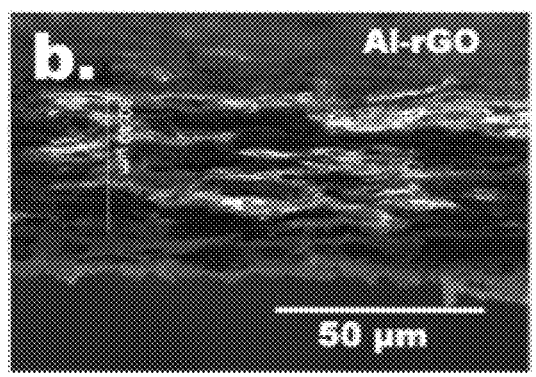
FIG. 12B. Cross-sectional SEM images of FGG films reduced on Al.
Figure 12C:
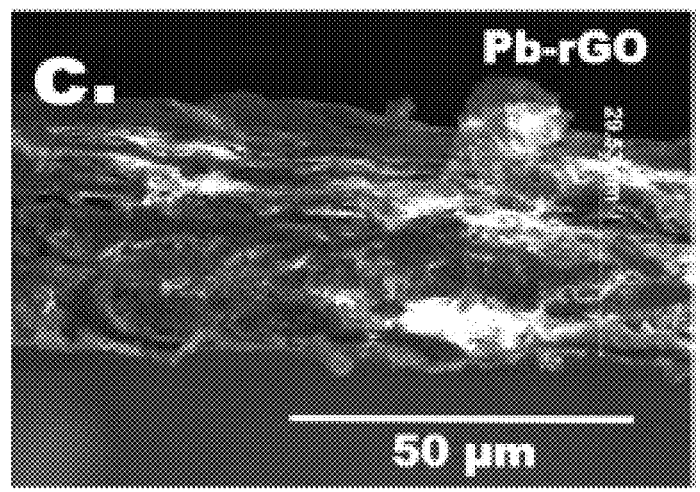
FIG. 12C. Cross-sectional SEM images of FGG films reduced on Pb.
Figure 12D:
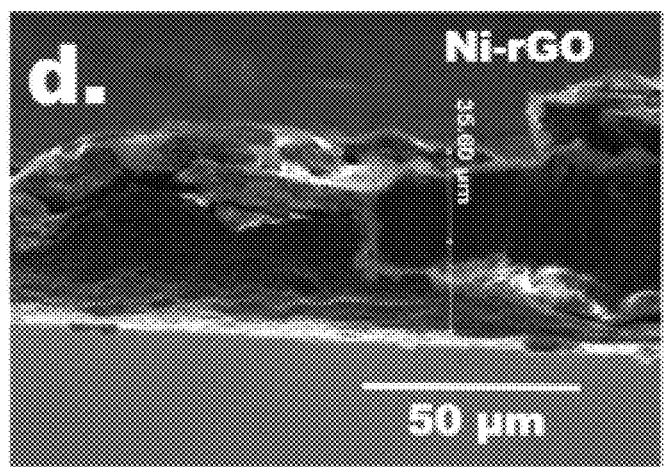
FIG. 12D. Cross-sectional SEM images of FGG films reduced on Ni.
Figure 12E:
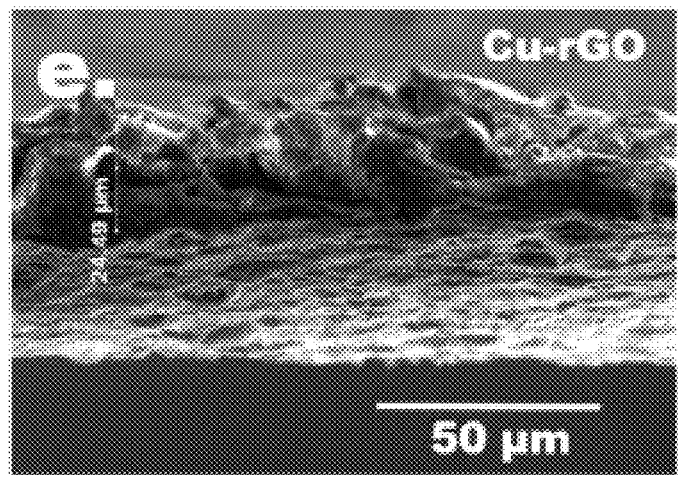
FIG. 12E. Cross-sectional SEM images of FGG films reduced on Cu.
Figure 13A:
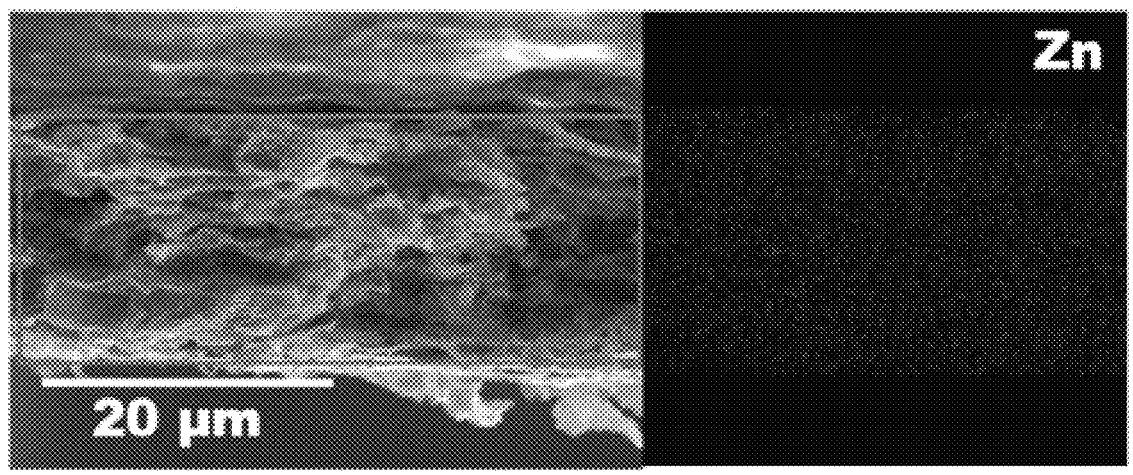
FIG. 13A. The elemental mapping of FGG films reduced on Zn. The metal elements were distributed uniformly throughout the films.
Figure 13B:
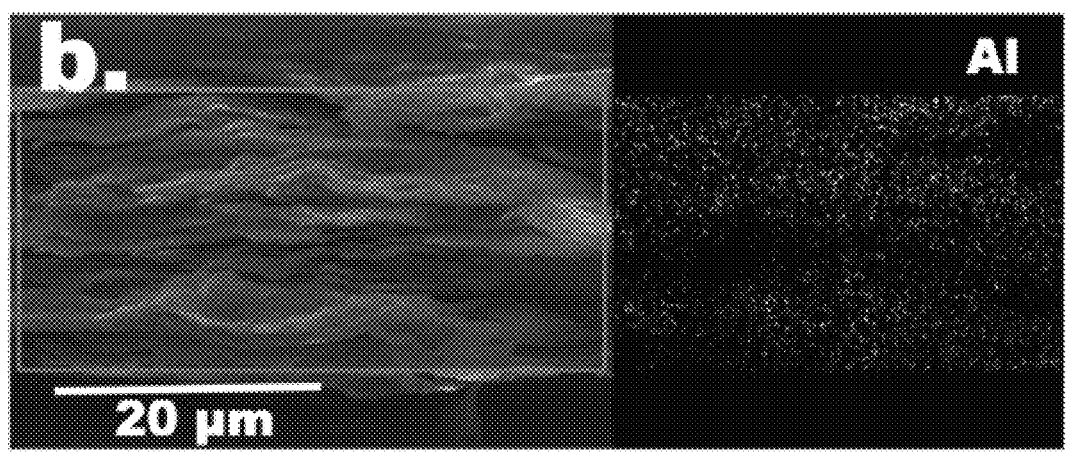
FIG. 13B. The elemental mapping of FGG films reduced on Al. The metal elements were distributed uniformly throughout the films.
Figure 13C:
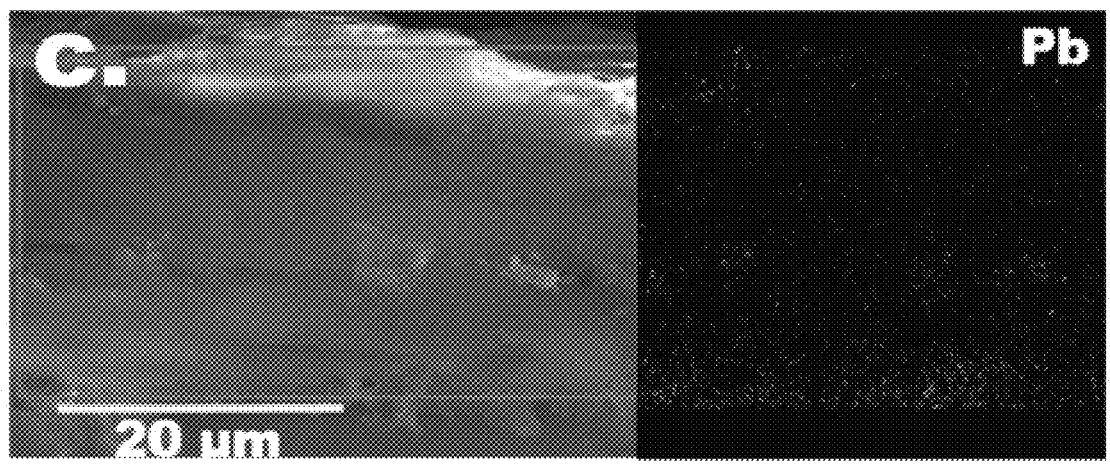
FIG. 13C. The elemental mapping of FGG films reduced on Pb. The metal elements were distributed uniformly throughout the films.

To demonstrate their actuation a 30×5 mm Al-FGG film was placed in a custom-made transparent controlled-humidity chamber. For different values of RH, the FGG films display different extents of bending (FIG. 11B, FIG. 11C). The oxygen-containing functional groups of GO control the expansion/contraction of the film through the absorption and repulsion of water molecules. At 100% RH, GO sheets absorb water molecules that induce an expansion of GO sheets and hence, develop a mismatch force between GO and rGO sheets. As a result, FGG film bends towards the rGO face in a moist environment. In contrast, when the value of the RH is decreased, the bending of the FGG film is shifted towards the GO face due to the repulsion of water molecules by the GO sheets. The mechanically strong, flexible, hygro-morphic FGG actuators are attractive for a wide variety of applications, such as soft-robotics and artificial muscles.

The SEM images of the cross-section of various metal assisted FGG films shown in FIG. 12A-12E revealed that the GO and graphene sheets were re-assembled into densely packed layer-by-layer microstructure. The corresponding elemental analysis (see FIG. 13A-FIG. 13E) conducted by EDX shows that the metal elements were well distributed throughout the films.

Figure 5:
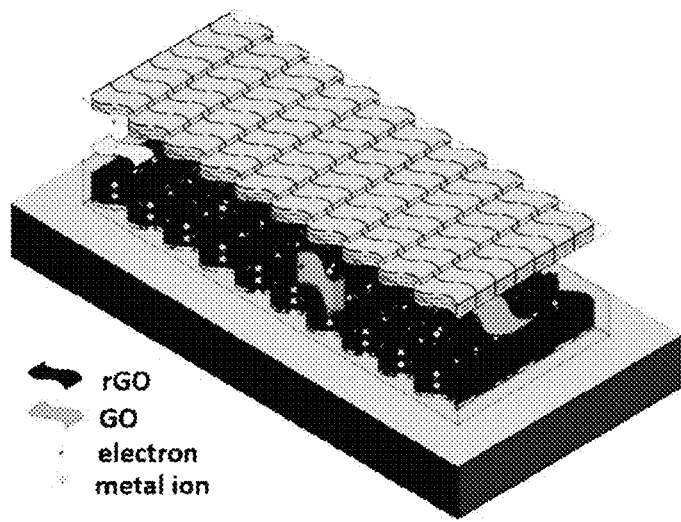
FIG. 5. Schematic illustration of reduction and FGG film formation mechanism.

The experimental results show the reduction and film formation mechanism of the FGG films. A schematic of the reduction mechanism is presented in FIG. 5. The reduction of GO commences at the interface of metal substrate while the GO begins drying from the top. Because of dehydration reaction of OH or epoxides from GO, the basal carbon atoms on the GO becomes positively charged. This positively charged GO is neutralized by adopting electrons from the metal and forming a double bond—$sp^2$ hybridization. Meanwhile, the metal is oxidized to metal ions ($M^+$) which can further interact with negatively charged GO generated by the deprotonation of carboxyl groups. In addition, some metals, for instance, Zn, can react with acidic media and can produce the nascent hydrogen with transient life at the interface. These hydrogens can interact with hydroxyl epoxy, and carbonyl groups of GO and produce water molecules by recovering the conjugated $sp^2$ carbon networks. Moreover, nascent hydrogen produces through an exothermic reaction, which generates instantaneous high temperature at the interface of Zn and GO. This can accelerate the reduction of GO further because GO can be effectively reduced at elevated temperature.

Examples of Uses

Transient electronics are a new class of electronics that physically disappear completely or disintegrate in a controlled or programmable manner. Since these electronics emit zero-waste to the environment, these transient electronics can be the substitute of existing electronics addressing the environmental burden electronics waste (E-waste).

The selective reduction of GO provides the ability to construct well-defined patterns and connections required in electronic circuits and devices.

Figure 6A:
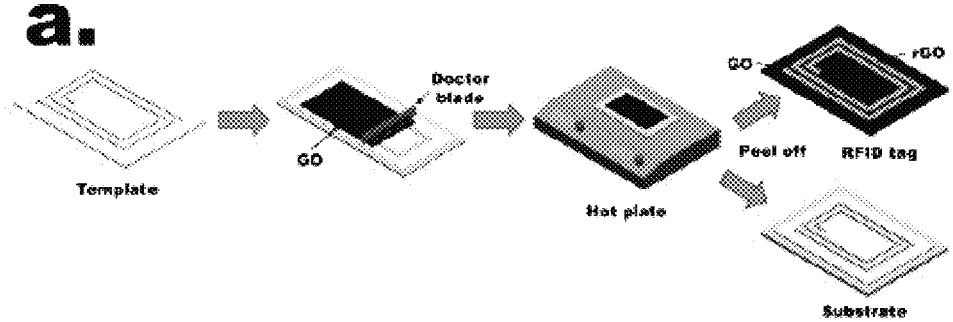
FIG. 6A. A schematic drawing of all graphene based selectively reduced GO for RFID antenna.
Figure 6B:
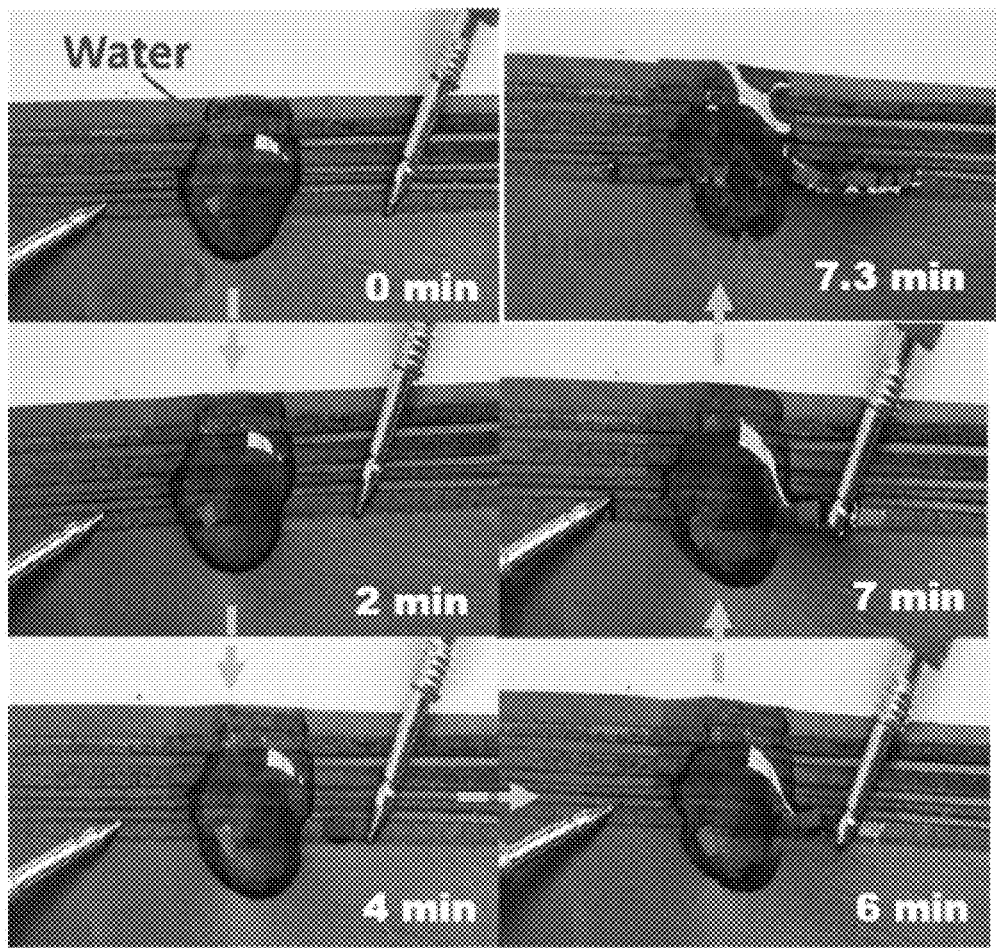
FIG. 6B. Photographs at different stages of disintegration process of electrical circuits.

A schematic of all graphene based selectively reduced GO for RFID antenna is demonstrated in FIG. 6A. A mask of the desired pattern is employed at the interface of the metal substrate and GO paste in order to the restoration of conjugated sp$^2$ networks selectively. A Silhouette Portrait electronic cutting tool is used to create masks with thin polymer sheets or papers. The reduction of GO occurs only on those portions which are exposed to the metal substrate while the remaining portions stay as GO. The GO paste along with the mask is dried at a controlled temperature and humidified conditions to obtain a smooth film without any cracks. After peeling-off the graphene based RFID tag antenna from the metal substrate and mask, the transient effect is characterized by placing few drops of distilled water at room temperature at the GO and rGO interfaces (FIG. 6B).

Figure 6C:
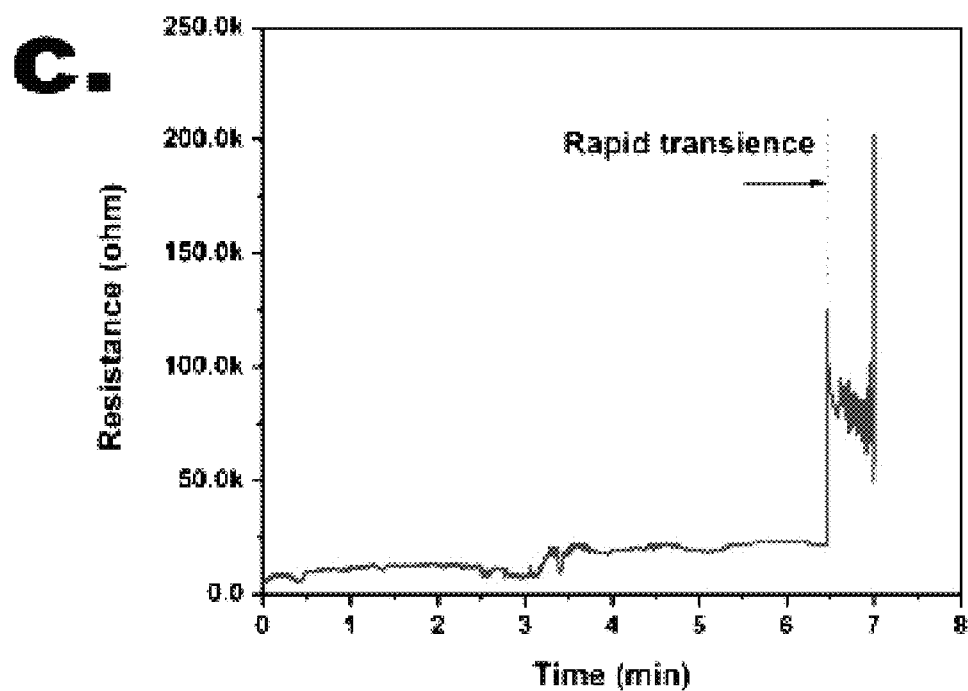
FIG. 6C. The ohmic resistance values during swelling of DI water at room temperature.

The ohmic resistance values were recorded during the dissolution process (FIG. 6C). Because of the differential swelling behavior of GO and rGO in water, the GO of RFID tag antenna which is highly hydrophilic, quickly absorbs water and swells, whereas, rGO is hydrophobic and repels water. As a result, the antenna circuit disintegrates into small pieces of rGO and loses its functionality. It can be seen in FIG. 6C, the resistance values gradually increased till 6.5 minutes by swelling water and then a very sharp rise of resistance, indicating the discontinuity of electrical circuit. The RFID antenna circuit was completely disintegrated in 7 minutes.

Figure 6D:
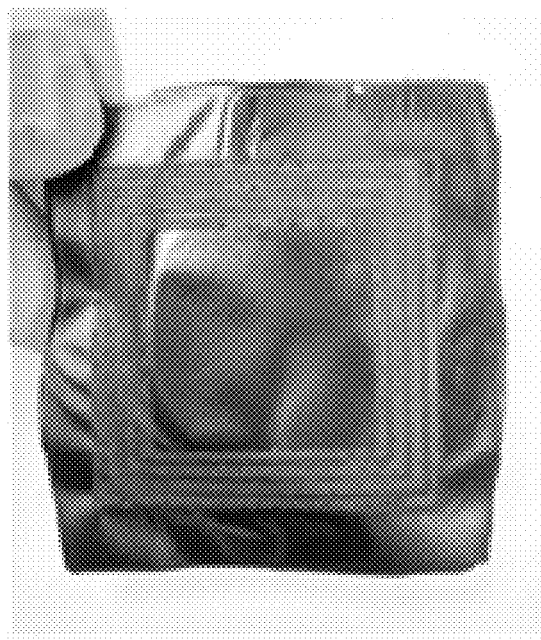
FIG. 6D. Photograph showing an all graphene based RFID tag antenna developed on Al.
Figure 6E:
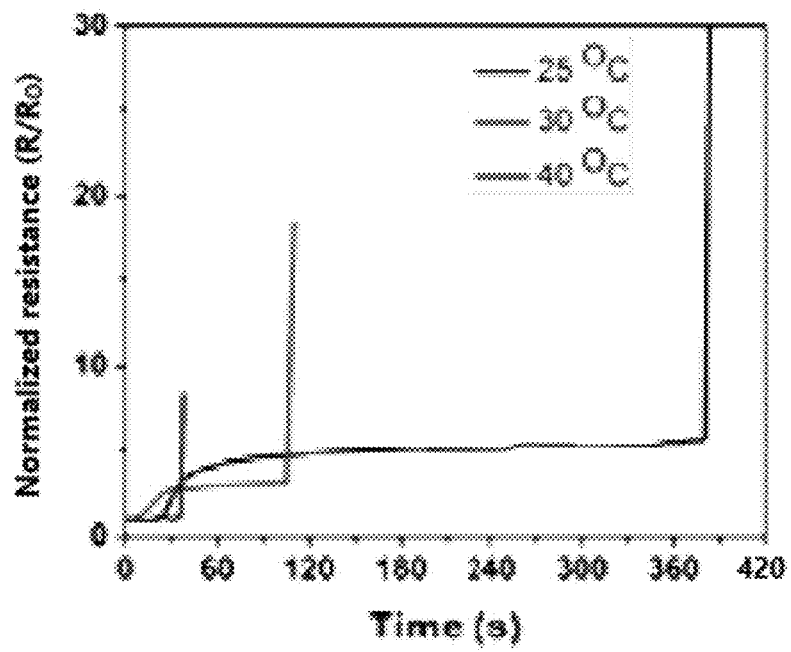
FIGS. 6E-6H. Changes in normalized ohmic resistance of U-shaped rGO recorded as a function of time during swelling in distilled water for different: temperatures (FIG. 6E); agitation rates (FIG. 6F); Ph (FIG. 6G); and, thicknesses (FIG. 6H) of the films.
Figure 6F:
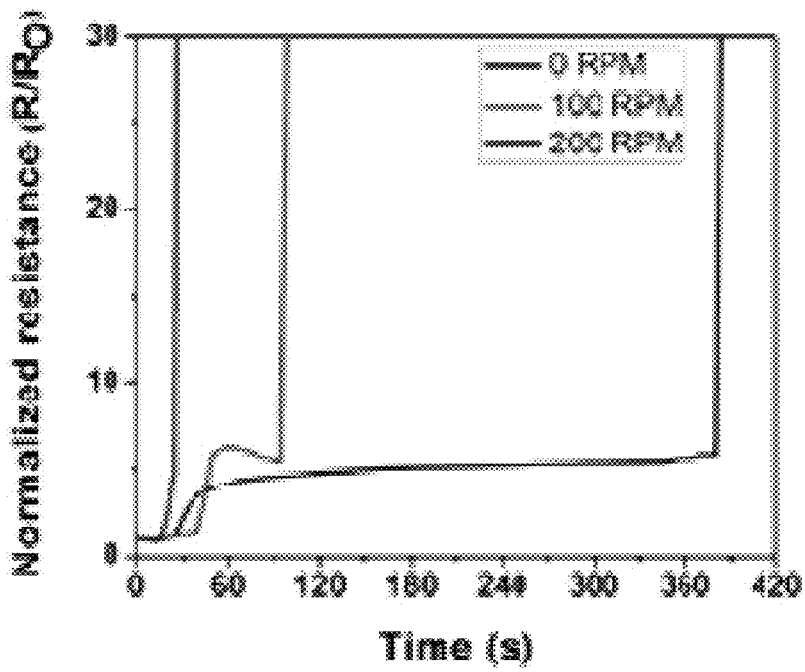
Figure 6G:
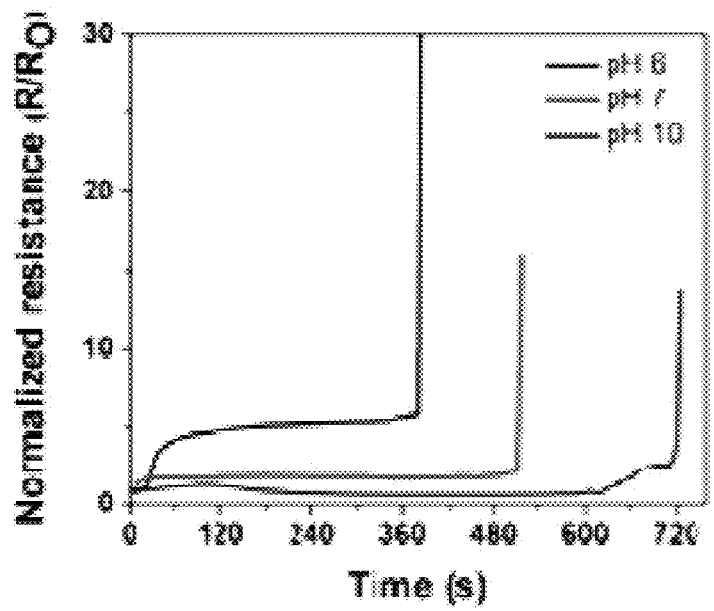
Figure 6H:
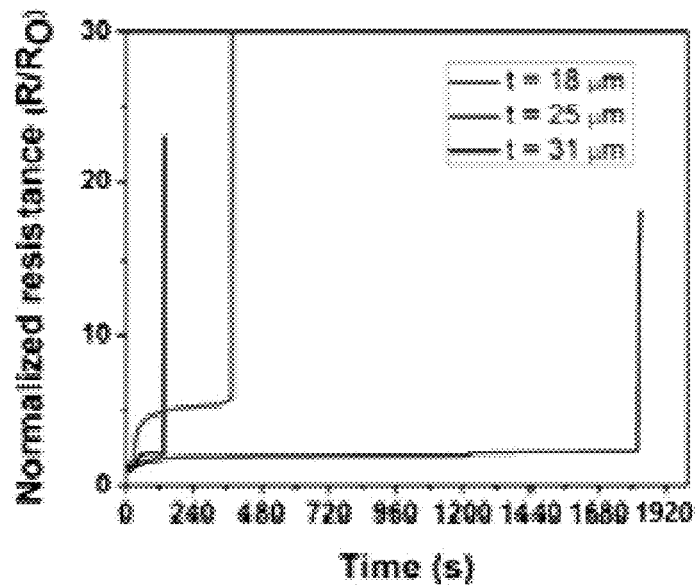

The selective reduction of GO offers the ability to construct well-defined patterns and connections required in electronic circuits and devices. A schematic of an all graphene based selectively reduced GO for an RFID tag antenna is demonstrated in FIG. 6A. A mask of the desired pattern is employed at the interface of the metal substrate and GO paste in order to restore the conjugated sp2 networks selectively. A Silhouette Portrait electronic cutting tool can be used to create masks with thin polymer sheets or papers. Only the selective portions of GO that are in contact with the metal substrate will be transformed into rGO, while the remaining portions covered with the mask will stay as GO. The GO paste along with the mask was dried under controlled temperature and humidity conditions to obtain a smooth film without any cracks. An image of an RFID tag antenna based on an all graphene construct prepared by a one-step coating process is shown in FIG. 6D. The RFID tag antenna is mechanically robust and flexible. Moreover, the inexpensive graphene-based RFID tag antenna can be disintegrated/decommissioned by an external stimulus with minimal impact on the surrounding environment.

Figure 6I:
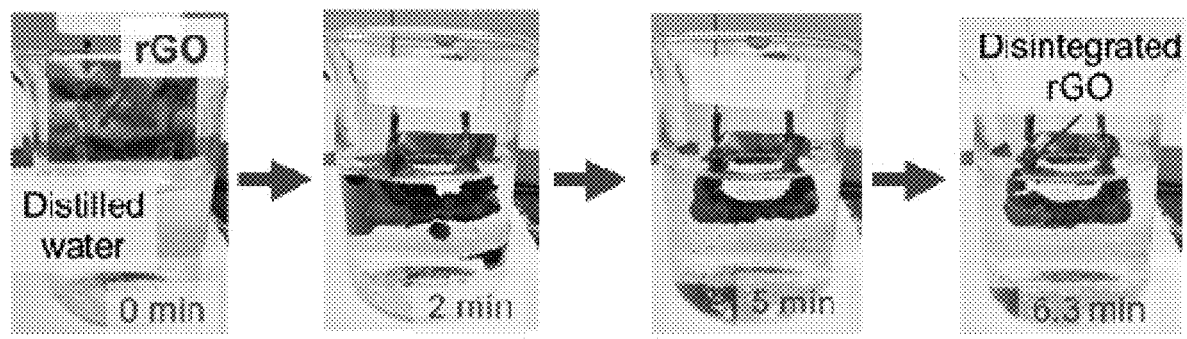
FIG. 6I. Photographs at different stages of the disintegration process of the U-shaped rGO imprinted on GO films.

To demonstrate the transient effect, a U-shaped reduced GO conductive path (30×20×3 mm) imprinted on a GO substrate (60×40 mm) with a thickness of ~25 μm was prepared. The film was immersed in distilled water in such a manner that half of the film was immersed in the liquid, while the rest, which included the probes of the ohm-meter, remained above the liquid surface. The ohmic resistance values were recorded during the dissolution process. The GO sheets absorb water and swell because of their hydrophilic nature, whereas, the rGO sheets repel water due to their hydrophobic nature. As a result, the U-shaped conductive circuit disintegrates into small pieces of rGO over time and loses its functionality. The transient behavior of this U-shaped conductive path was examined under different environmental conditions including the temperature of the water, agitation of the liquid, and the pH, as well as the film thickness. As can be seen in FIGS. 6E, 6F, 6G, 6H, increasing the water temperature, inducing a weak agitation of the liquid, lowering the pH value or reducing the thickness of the film, all favor the dissolution process. Images from the transience experiments at different stages of disintegration are presented in FIG. 6I. While the GO starts to disintegrate in water through swelling after approximately 2 minutes, the electrically conductive path is completely disrupted only after 6.3 minutes. All the graphene-based electrical circuits shown in this study can also be disintegrated without submersing the films under water. For instance, placing a few drops of water on the conductive path can disrupt the circuit within a few minutes (FIGS. 6A-6B).

Figure 20D:
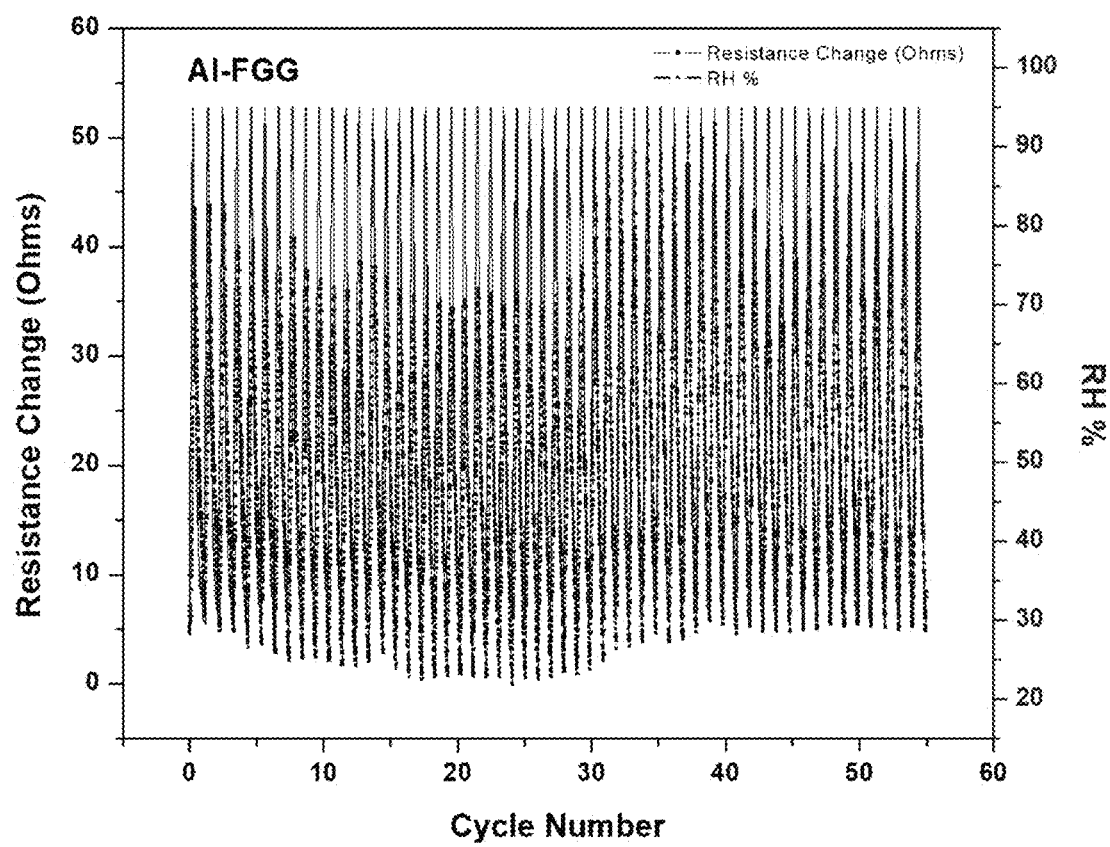
FIG. 20D: Application of Al-FGG films as humidity sensors through change in base resistance over changing room humidity for 55 cycles (RH=30%-95%).

Being hydrophilic in nature, the FGG films are also tested for their humidity sensing characteristics. In one testing environment, the Al-FGG films were exposed to cyclic humidity levels ranging from RH=30% to RH=95% in an isolated chamber with a constrained temperature range (0-2° C.). The films were tested for their electrical characteristics through response to the surrounding humidity and their impact on the sheet resistance (Rs). (FIG. 20D) shows the cyclic humidity levels (185 sec/cycle) and the corresponding change in sheet resistance from the base value (at 30%RH). It can be observed that the base resistance changes by 30 Ohms for a complete individual cycle. Moreover, the cyclic change of sheet resistance is continuous over the entire experiment (>50 cycles), denoting good accuracy (+−0.84 Ohms) and repeatability of the sensor. The humidity sensor based on Al-FGG film, exhibits a high sensitivity of 0.4615 Ohms/RH % and a response time of 1.21 seconds. Along with hygro-morphic actuation and humidity sensing, the FGG films are useful in applications in modern actuation and sensing devices that require a stable and accurate response over long usage.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

The publication and other material used herein to illuminate the invention or provide additional details respecting the practice of the invention, are incorporated be reference herein, and for convenience are provided in the following bibliography.

Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

What is claimed is:

1. A composition comprising a functionally graded graphene-based (FGG) material having:
   a first surface comprising an at least partially electrically conductive reduced graphene oxide (rGO);
   an opposite surface comprising an at least partially insulating graphene oxide (GO), wherein the GO is hydrophilic; and
   a gradient of rGO to GO from the first surface to the opposite surface.

2. The composition of claim 1, wherein the first surface of the FGG material is a porous surface, and wherein the surface morphologies on the opposite surface are smooth compared to the first surface.

3. The composition of claim 1, wherein the GO in the FGG material is present at a concentration ranging from 45-60 mg/mL.

4. The composition of claim 1, wherein the FGG material has disintegration characteristics upon exposure to a trigger environmental stimulus.

5. The composition of claim 4, wherein the trigger environmental stimulus comprises exposure to an aqueous environment.

6. The composition of claim 1, wherein the FGG material has a thickness selected in accordance with a preselected electrical conductivity for the FGG material.

7. The composition of claim 1, wherein the FGG material comprises a free standing film.

8. A film comprising the composition of claim 1.

9. A hygro-morphic actuation device comprising the film of claim claim 8.

10. A transient electronic humidity sensing device comprising the film of claim 8.

11. A device comprising the FGG material of claim 1, wherein the device is one or more of: a transient electronic device, flexible circuitry, an RFID tag, an electrode, a biodegradable product, or a functional labeling or coating for polylactide based food packaging.

12. The device of claim 11, wherein the FGG material is patterned by a template or a mask, thereby allowing for through-profile as well as lateral placement of both electrically conducting (rGO) and non-conducting (GO) regions in a single device.

13. The composition of claim 1, wherein the thickness of the FGG material ranges from about 22 μm to 87 μm.

14. The composition of claim 1, wherein the gradient of rGO-to-GO includes a non-uniform elimination of oxygen-containing functional groups and restoration of π-conjugated structure throughout the FGG material.

15. A composition comprising a functionally graded graphene-based (FGG) material having:
    a first surface comprising an at least partially electrically conductive reduced graphene oxide (rGO);
    an opposite surface comprising an at least partially insulating graphene oxide (GO), wherein the GO is hydrophilic; and
    a gradient of rGO to GO from the first surface to the opposite surface, wherein the gradient of rGO to GO includes a non-uniform elimination of oxygen-containing functional groups and restoration of π-conjugated structure throughout the FGG material.

16. A composition comprising a functionally graded graphene-based (FGG) material having:
    a first side comprising an at least partially electrically conductive reduced graphene oxide (rGO), and;
    an opposite side comprising an at least partially insulating graphene oxide (GO), wherein the GO is hydrophilic;
    wherein a gradient of rGO to GO exists from the first side to the opposite side, the gradient comprising a non-uniform elimination of oxygen-containing functional groups and restoration of π-conjugated structure throughout the FGG material.

* * * * *